United States Patent
Lindenmeier et al.

(10) Patent No.: US 10,595,281 B2
(45) Date of Patent: Mar. 17, 2020

(54) ANTENNA DEVICE FOR A BIDIRECTIONAL COMMUNICATION OF VEHICLES

(71) Applicant: FUBA Automotive Electronics GmbH, Bad Salzdetfurth (DE)

(72) Inventors: Stefan Lindenmeier, Gauting-Buchendorf (DE); Heinz Lindenmeier, Planegg (DE)

(73) Assignee: FUBA AUTOMOTIVE ELECTRONICS GmbH (DE)

( * ) Notice: Subject to any disclaimer, the term of this patent is extended or adjusted under 35 U.S.C. 154(b) by 0 days.

(21) Appl. No.: 16/370,379

(22) Filed: Mar. 29, 2019

(65) Prior Publication Data
US 2019/0335401 A1 Oct. 31, 2019

(30) Foreign Application Priority Data
Mar. 31, 2018 (DE) .................. 10 2018 002 661

(51) Int. Cl.
| | |
|---|---|
| *H04W 4/46* | (2018.01) |
| *H04W 52/24* | (2009.01) |
| *H04W 52/38* | (2009.01) |
| *H04W 52/42* | (2009.01) |
| *H04W 84/00* | (2009.01) |

(52) U.S. Cl.
CPC .......... *H04W 52/241* (2013.01); *H04W 4/46* (2018.02); *H04W 52/383* (2013.01); *H04W 52/42* (2013.01); *H04W 84/005* (2013.01)

(58) Field of Classification Search
CPC ... H04W 52/241; H04W 4/46; H04W 52/383; H04W 52/42; H04W 84/005

USPC ........................................................ 455/522
See application file for complete search history.

(56) References Cited

U.S. PATENT DOCUMENTS

| | | | | |
|---|---|---|---|---|
| 7,058,418 B2 * | 6/2006 | Doi | ...................... | H01Q 3/2605 342/372 |
| 7,212,784 B2 * | 5/2007 | Doi | ...................... | H01Q 3/2605 455/39 |
| 7,215,931 B2 * | 5/2007 | Snyder | ................... | H03D 7/163 375/223 |
| 7,346,040 B2 * | 3/2008 | Weinstein | ............. | H04L 1/0026 370/339 |
| 7,567,610 B2 * | 7/2009 | Adan | ................... | H03D 7/1441 375/219 |
| 8,116,395 B2 * | 2/2012 | Sato | ..................... | H04L 27/2647 329/318 |

(Continued)

FOREIGN PATENT DOCUMENTS

| | | |
|---|---|---|
| DE | 10100812 A1 | 7/2002 |
| DE | 102006057520 A1 | 6/2007 |

OTHER PUBLICATIONS

Official Communication from the European Patent Office for related European Patent Application No. 19165537.2; dated Aug. 27, 2019; 7 pages.

*Primary Examiner* — Hai V Nguyen
(74) *Attorney, Agent, or Firm* — Dickinson Wright PLLC

(57) ABSTRACT

An antenna device for a vehicle for a vehicle serves for a vehicle transceiver device whose transmission power level regulation device is configured in a manner such that, during the bidirectional communication, the transmission power level is set as larger as the quality of the communication link falls and is conversely lowered as the transmission quality of the communication link increases.

15 Claims, 12 Drawing Sheets

(56) References Cited

U.S. PATENT DOCUMENTS

Figure 1:
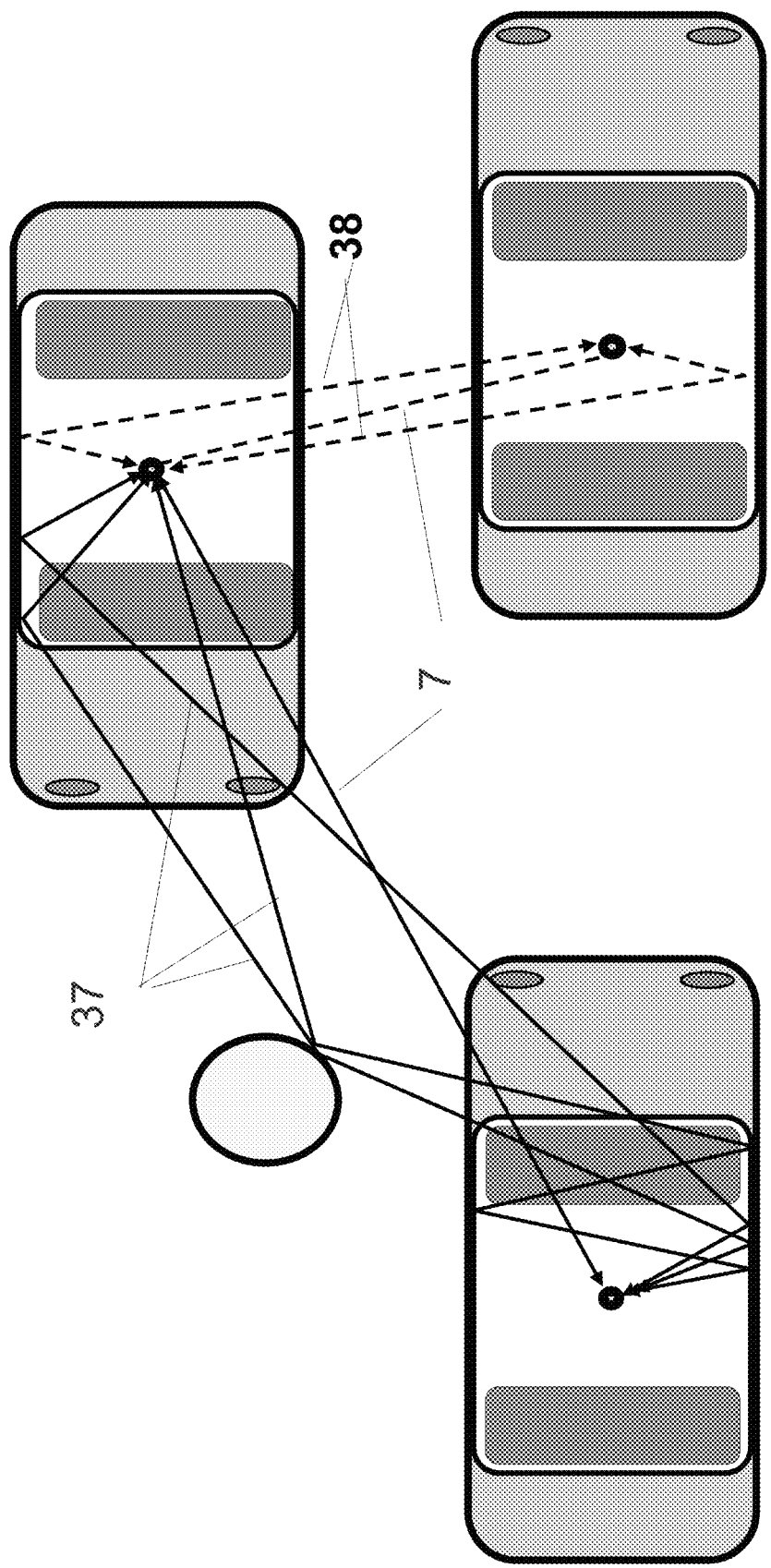

| | | | |
|---|---|---|---|
| 8,369,379 B2* | 2/2013 | Ye | H04J 3/0608 |
| | | | 370/436 |
| 8,856,850 B2* | 10/2014 | Sala | H04N 17/00 |
| | | | 725/107 |
| 9,001,932 B2* | 4/2015 | Ruelke | H04N 21/42638 |
| | | | 375/322 |
| 9,059,768 B1* | 6/2015 | Sorsby | H04B 1/123 |
| 9,161,386 B1* | 10/2015 | Beghini | H04W 88/06 |
| 9,214,086 B1* | 12/2015 | Onishi | G08G 1/096791 |
| 10,264,525 B2* | 4/2019 | Pratt | H04W 52/0209 |
| 10,419,655 B2* | 9/2019 | Sivan | H04W 4/80 |
| 2003/0153338 A1* | 8/2003 | Herz | H04W 4/029 |
| | | | 455/517 |
| 2004/0048585 A1* | 3/2004 | Snyder | H03D 7/163 |
| | | | 455/115.1 |
| 2005/0117664 A1* | 6/2005 | Adan | H03D 7/1441 |
| | | | 375/316 |
| 2006/0079194 A1* | 4/2006 | Tired | H03F 3/191 |
| | | | 455/283 |
| 2006/0211439 A1 | 9/2006 | Mizugushi | |
| 2007/0142074 A1 | 6/2007 | Black et al. | |
| 2007/0160116 A1 | 7/2007 | Harel et al. | |
| 2007/0218850 A1* | 9/2007 | Pan | H03D 7/1441 |
| | | | 455/189.1 |
| 2008/0300002 A1* | 12/2008 | Sheffer | H04B 1/7097 |
| | | | 455/509 |
| 2011/0130163 A1* | 6/2011 | Saban | H04W 88/085 |
| | | | 455/517 |
| 2011/0267474 A1* | 11/2011 | Sala | H04N 17/00 |
| | | | 348/180 |
| 2014/0185718 A1* | 7/2014 | Ruelke | H04N 21/42638 |
| | | | 375/345 |
| 2015/0348412 A1* | 12/2015 | Onishi | G08G 1/096791 |
| | | | 340/905 |
| 2016/0219506 A1* | 7/2016 | Pratt | H04W 52/0209 |
| 2017/0244160 A1* | 8/2017 | Neubecker | H01Q 3/08 |
| 2018/0062767 A1* | 3/2018 | Vallese | H04B 17/318 |
| 2019/0154439 A1* | 5/2019 | Binder | G01B 11/26 |
| 2019/0182415 A1* | 6/2019 | Sivan | H04N 5/23203 |
| 2019/0305903 A1* | 10/2019 | Badic | H04L 5/0041 |
| 2019/0364492 A1* | 11/2019 | Azizi | H04W 24/08 |
| 2019/0387152 A1* | 12/2019 | Sivan | H04N 5/23203 |

* cited by examiner

ANTENNA DEVICE FOR A BIDIRECTIONAL COMMUNICATION OF VEHICLES

The invention relates to an antenna device for bidirectional communication on vehicles.

The invention in particular relates to an antenna device on a vehicle for bidirectional communication from vehicle to vehicle—known e.g. as V2V—and for vehicle to infrastructure communication—known e.g. as V2X.

The improvement of mobile reception in vehicles is described for fixedly installed radio networks, for example, in DE10100812 A, DE102007011636 A, DE102005043304 and DE102006057520 A. It is common to all the antenna systems described in this prior art that they are only configured for reception systems, that is for the improvement of the reception, i.e. for unidirectional radio operation.

Modern radio systems for bidirectional communication of vehicles among one another and for the communication of vehicles with the infrastructure, for example known as V2V (vehicle to vehicle) or car2car (car to car) work bidirectionally in a transmission mode and a reception mode. These systems are based on an automatically set up ad hoc and fast data transfer between vehicles and between vehicles and communication devices lining the road. The transmission of traffic information, hazard warnings, and entertainment content is provided here. Unlike the systems named in connection with the prior art having fixedly installed transmission systems, for example radio systems having permanent transmission, no preinstalled network infrastructure is provided for the communication of vehicles between each other. These systems are rather based on a wireless LAN technology, wherein the radio links are established as automatic communication formed in an ad hoc manner for a range of a few 100 meters. The vehicle to vehicle communication established on an ad hoc basis enables the cooperation of vehicles by a radio link of a plurality of vehicles among one another and it is possible by a distribution of information among these vehicles to improve comfort and safety in road traffic to a high degree.

A frequency band is currently provided for the vehicle to vehicle communication network having a frequency bandwidth of 70 MHz at 5.9 GHz, divided into seven frequency channels of 10 MHz frequency bandwidth in each case as part of the DSCR standard. An organizational frequency channel for bidirectional digital communication of the frequency bandwidth of 10 MHz at the frequency center of the 70 MHz wide frequency band is provided for the organization of the vehicle to vehicle communication network. The vehicle related radio system comprises a transmission and reception system that is composed in the simplest case of a transceiver device (transmission and reception) and a transmission and reception antenna. The bidirectional data radio traffic can be organized on one of the frequency channels sequentially in consecutive transmission or reception time slots or the transmission and reception take place simultaneously on different frequency channels. Transceiver devices are, for example, available as single-channel transceivers for bidirectional communication on a specific channel or also on any desired channel in the frequency band or as multichannel transceivers for bidirectional communication on different channels for transmission and reception. They all have a radio frequency connector 3 for connecting an antenna on the vehicle in common. Such an antenna in accordance with the prior art is, for example, attached to the roof, preferably at its center. Such a transmission and reception situation is, however, exposed to the known interference also described in connection with the prior art due to multipath propagation. A monopole antenna on the roof, but at the center of the roof, is assumed for the simplest case. The required condition of the circular characteristic of the antenna arrangement in a horizontal plane is satisfactorily achieved for this antenna. As a rule this installation location is, however, not available to the antenna for automotive engineering reasons. For this reason, other installation locations on the vehicle have to be looked for that, however, all have a substantially negative influence on the directivity of the antenna system due to the influence of the vehicle structure.

The impairment of the communication is particularly serious if such an antenna is, for example, attached to the lower side of the roof, that is in the interior of the vehicle. FIG. 1 shows the corresponding scenario of the wave propagation in a communication network for bidirectional communication in a communication network set up in an ad hoc manner between a group of vehicles when a monopole antenna is not attached on the roof, but rather, for example, to the lower side of the roof. A plurality of waves 37 propagating via diversions contribute to the radio connection between the vehicles in addition to the electromagnetic waves 7 incident directly in accordance with the line of sight. They in particular include, in addition to the electromagnetic waves contributing via reflections in the environment of the vehicles, all the reflections and diffractions that electromagnetic bundles of waves 38 experience at the inhomogeneous structures of their own vehicles. The bodywork is partly reflective and partly permeable for the wavelength propagation in a statistical manner due to the small free wavelength of approximately 5 cm at a frequency of approximately 6 GHz in comparison with the vehicle dimensions and with the openings in the electrically conductive bodywork. The statistically completely uncoordinated superposition of all wave portions of different phases and magnitudes produce temporary signal extinctions, in particular also due to temporary shading, at the antennas in the moving vehicle. Digital information is thereby lost. The desired circular characteristic of the directional pattern of the vehicle antenna cannot be achieved with this arrangement. The response pattern of the antenna fans out in many cases due to the influence of the vehicle bodywork having deep indentations. An interference free radio reception for a good radio link between the vehicles in a scenario of the actual vehicle environment cannot be achieved with an antenna device of this kind.

The transmission security of the data with respect to traffic safety is of special importance for vehicle to vehicle communication or for vehicle to infrastructure communication and there is a special need for a secure radio frequency link between the vehicles and thus for an antenna device that largely avoids the interference caused by multipath propagation or Doppler effects in the moving vehicle.

It is therefore the object of the invention to provide an antenna device on a vehicle that is connected to the radio frequency connector of the transceiver device and automatically substantially reduces said interference both for reception and for transmission in bidirectional communication.

This object is satisfied by an antenna device having the features of claim 1.

An antenna device is disclosed on a vehicle for a vehicle transceiver device 2 whose transmission power level regulation device is designed such that the transmission power level 5 is set greater as the quality of the communication link falls and is conversely lowered as the transmission quality of the communication link increases during the bidirectional communication, comprising at least some of the following features:
- the antenna device is configured as an antenna diversity device 1 having a plurality of antenna elements 34a, 34b . . . in a manner such that a plurality of diversity settings can be selected for a selection of different radiation directivities for transmission and for reception
- the antenna diversity device 1 is connected to the radio frequency connector 3 of the vehicle transceiver device 2
- a power level detector 6 is present in the antenna diversity device 1 and the transmission power level 5 of the vehicle transceiver device 2 is detected and constantly registered by it and
- to increase the transmission quality of the communication link, a setting of the antenna diversity device 1 is selected at which a smaller transmission power level is reached after an alternatingly carried out selection of a respective different setting of the antenna diversity device 1 and a detection of the transmission power level present at this setting.

Advantageous embodiments of the invention are described in the drawing, in the dependent claims and in the description.

During bidirectional communication in the antenna diversity device 1, a different setting of the antenna diversity device 1 can be selected as part of a test procedure in consecutive test steps in a respective manner such that the transmission power level 5 occurring at each test setting is respectively detected and stored as a test transmission power level 9 of the vehicle transceiver device 1 and a setting of the antenna diversity device 1 is selected with reference to the comparison of the test transmission power levels 9 with one another at the end of the test process at which a smaller transmission power level 5 is detected.

The following assemblies can be included in the antenna diversity device 1:
- a multi-antenna system 12 comprising a plurality of antenna elements 34a, 34b, 34c, . . . on the vehicle:
- a diversity control device 10 having the following assemblies
- at least one controllable antenna combiner 11 having the combiner signal connector 18 and having the control connector 8 for a controlled setting of different radiation directivities of the multi-antenna system 12 to which the antenna elements 34a, 34b, 34c, . . . of the multi-antenna system are connected;
- a low-loss multiport coupling element 13 whose first port 14 is connected to the radio frequency connector 3 of the vehicle transceiver device 2 and whose second port 15 is connected to the combiner signal connector 18, with a strong coupling being present between the first port 14 and the second port 15 and at least one further port, called the transmission signal port 16, with a weak coupling to the first port 14 being present;
- a power level detector 6 that is connected at the input side to the transmission signal port 16;
- at least one microprocessor with memory 17 that is connected at the input side to the output of the power level detector 6 and at the output side to the control input 8 of the controllable antenna combiner 11; and
- an algorithm is stored in the microprocessor with memory 20 to control the controllable antenna combiner 11 by which a respective smaller transmission power level 5 is displayed by the power level detector 6 after the end of a test procedure.

Figure 4:
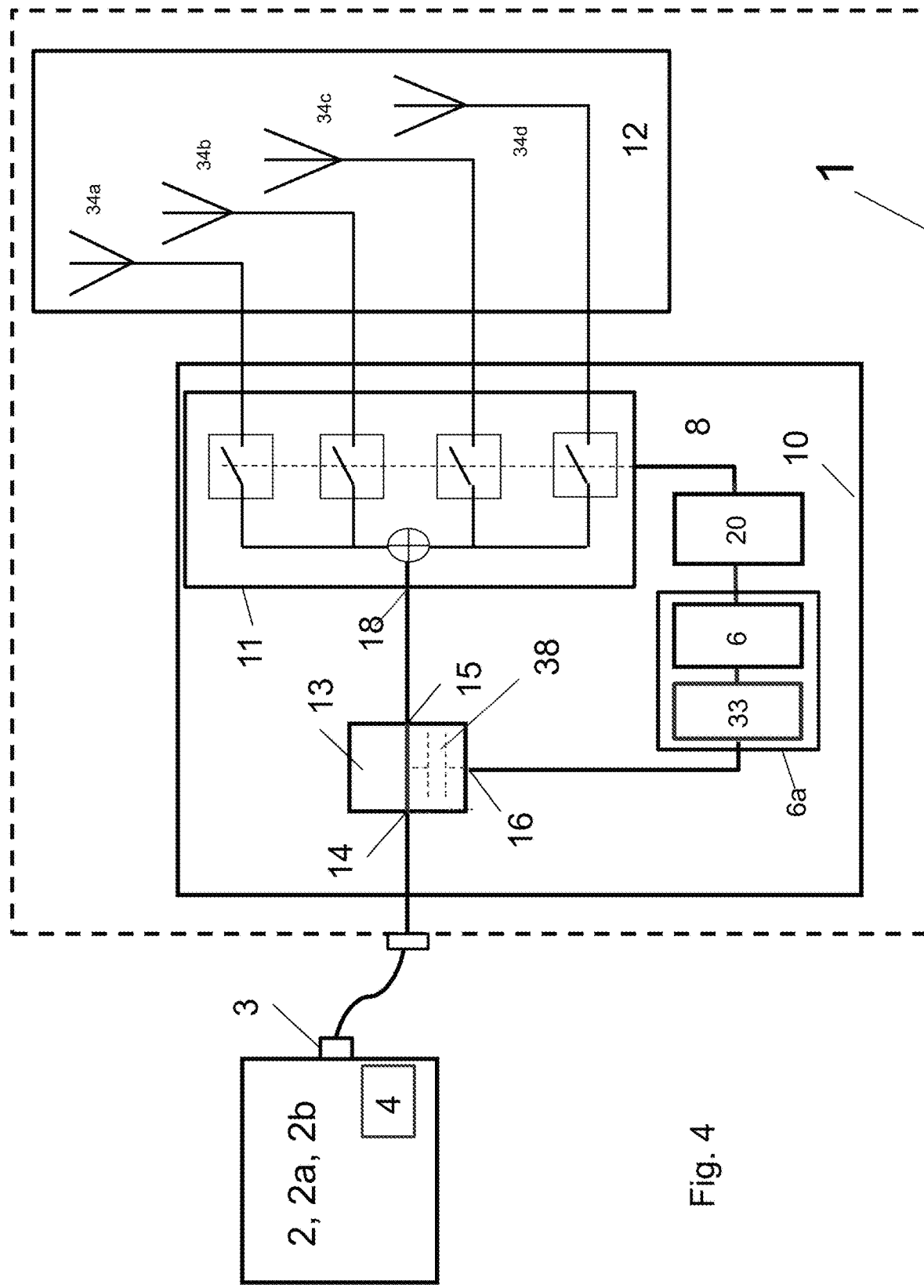
Figure 5:
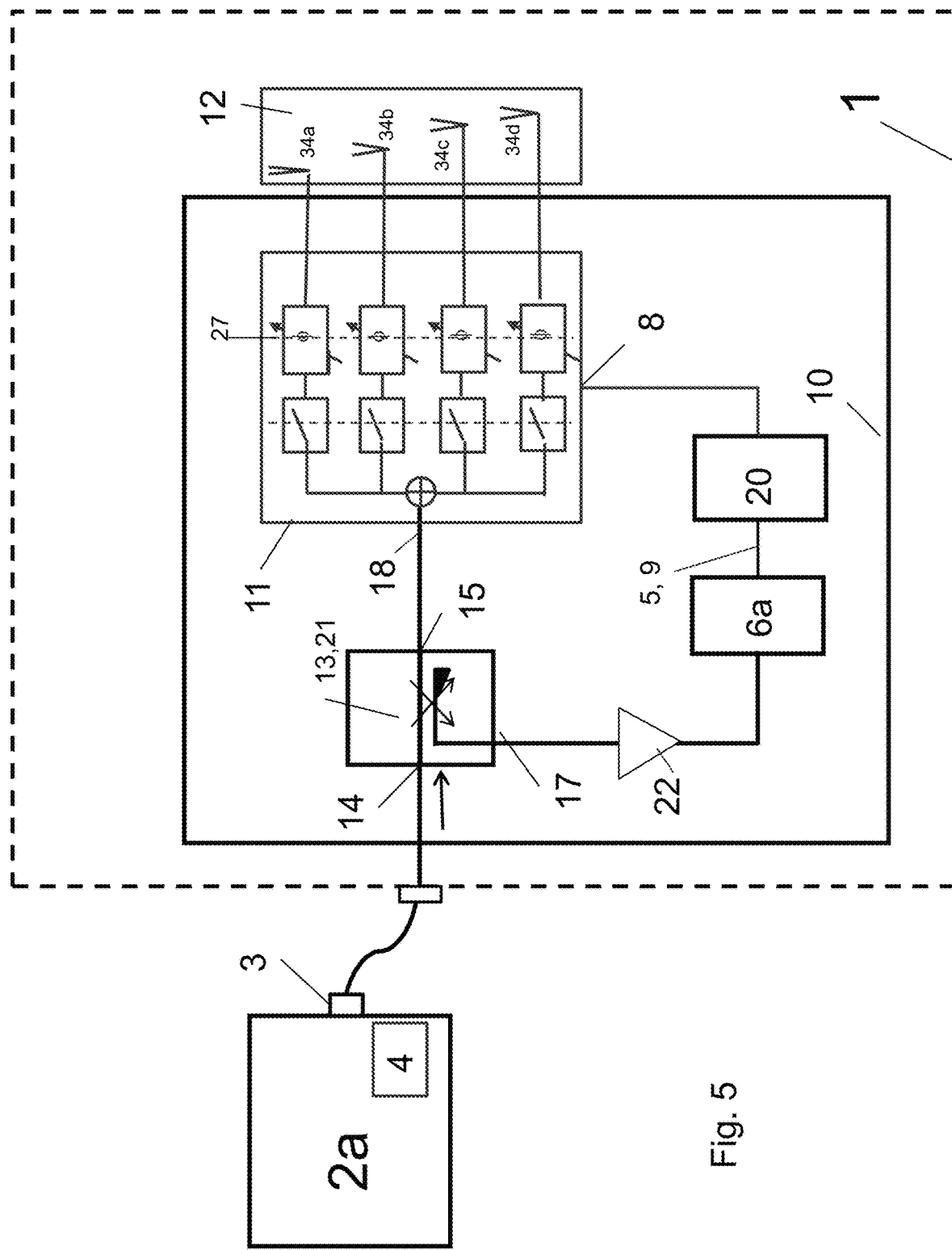
Figure 6:
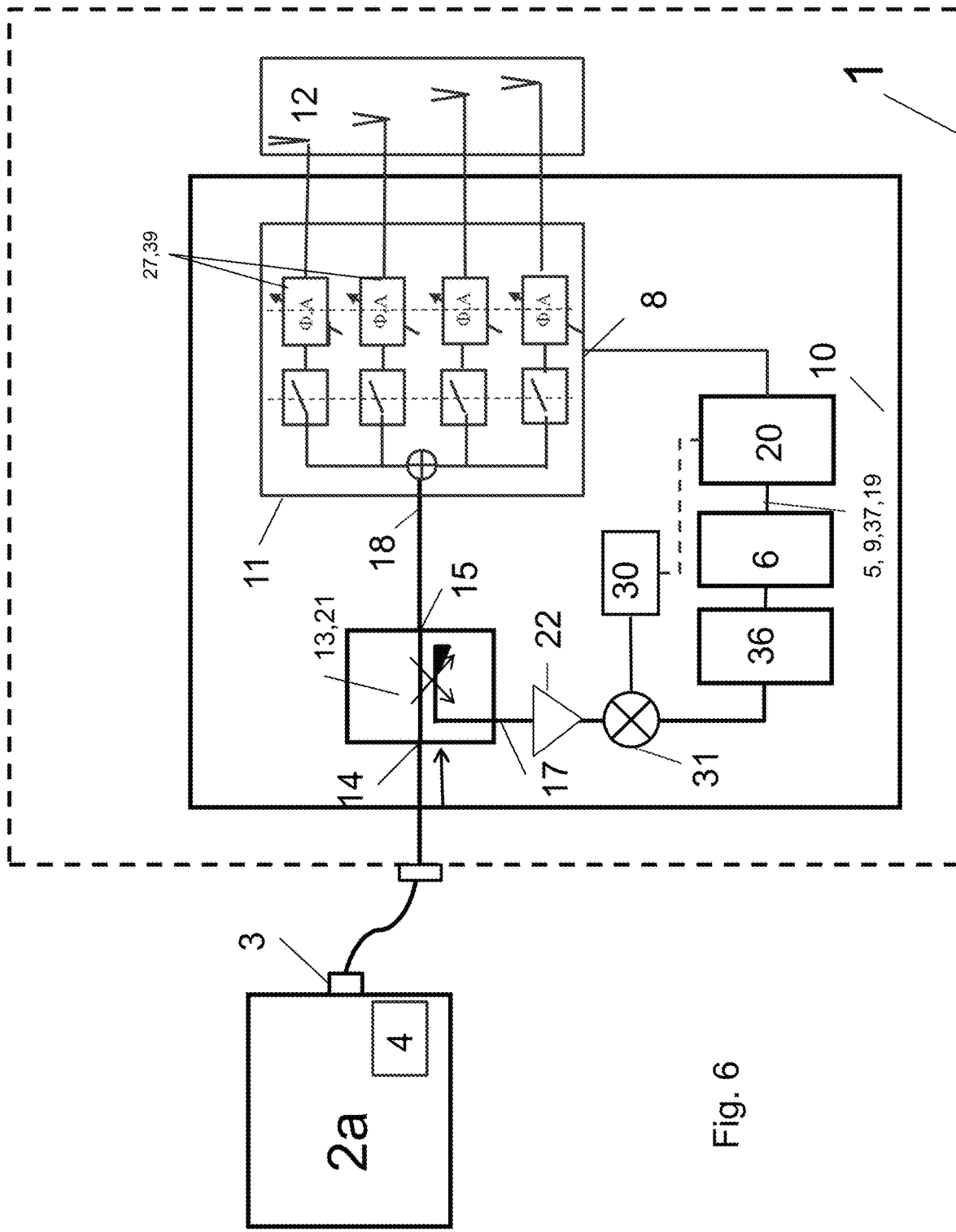
Figure 12:
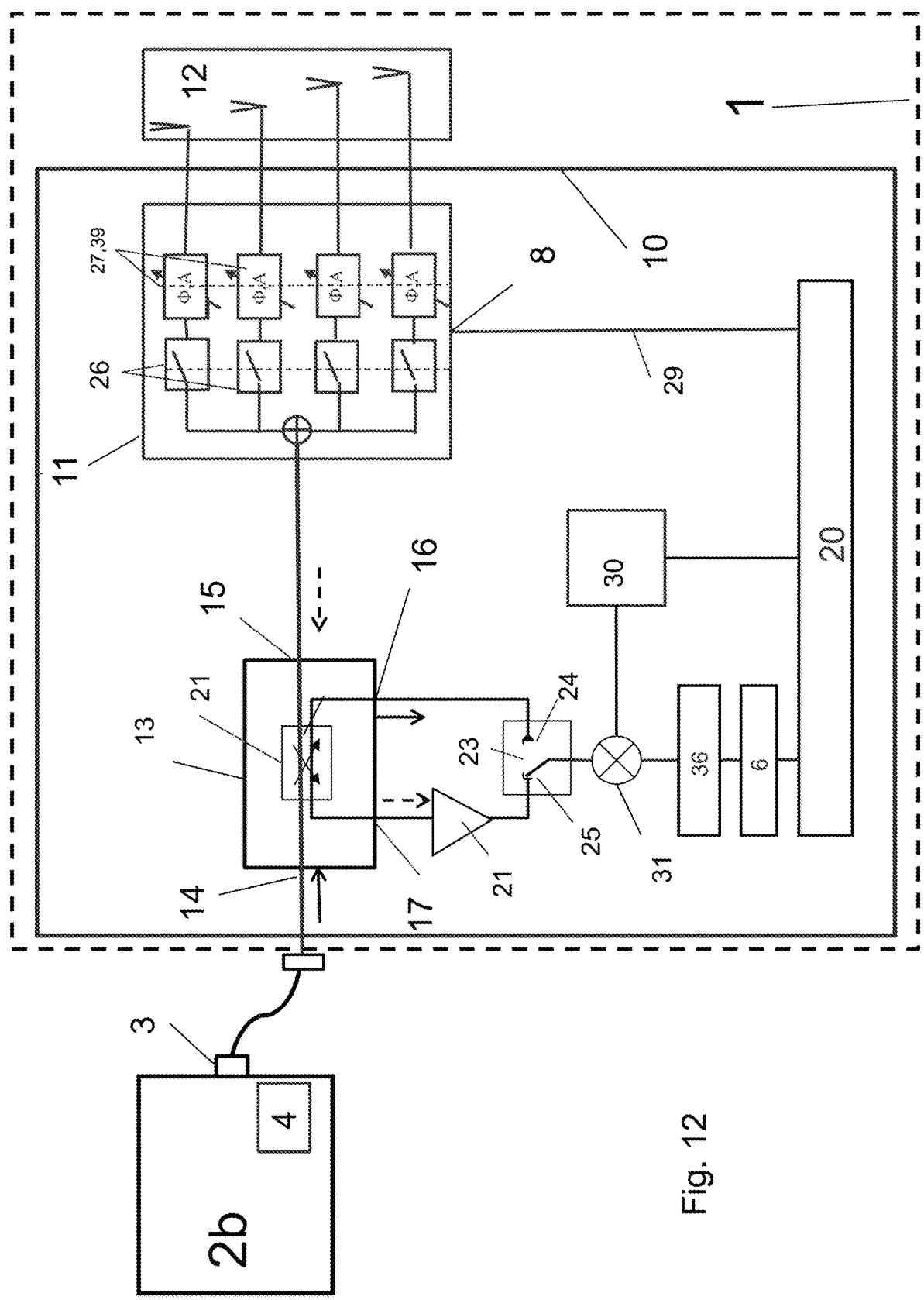

Further optional features are characterized in that:
- the connection between the first port (14) and the second port (15) is designed as electrically conductive and the weak coupling of the transmission signal port (16) is provided by a capacitor (19), (FIG. 4); and/or in that
- the reception signal reduced by the coupling loss and the transmission signal reduced by the directivity loss of the directional coupler (21) are taken at the reception signal port (17) and a signal amplifier (22) is present to which these signals are supplied and which is connected upstream of the power level detector (6) at whose output the test transmission power levels (9) and the test reception power levels (19) are supplied to the microprocessor (20) for a control sequential in time of the controllable antenna combiner (11), FIG. 5); and/or in that
- a frequency band filter (33) is present that is connected upstream of the power level detector (6) to suppress signals outside the frequency band provided for the communication (FIG. 4); and/or in that
- to support the dynamic range of the level detection, the latter is present in a lower intermediate frequency domain, with a frequency mixer (31) being present for this purpose having an oscillator (30) voltage controlled by the microprocessor with memory (20) by which the reception signals and transmission signals are converted to a lower intermediate frequency domain and the level detection for processing in the microprocessor with memory (20) is present in the power level detector (6) to which an IF frequency channel band filter (36) is connected upstream (FIG. 6); and/or in that
- a power level detector (6) is, however, present for the separate detection of the transmission signals predominantly applied at the transmission signal port (17) and of the reception signals for the detection of the test transmission levels (5, 9) predominantly applied at the reception signal port (16) and a separate reception power level detector (28) having a frequency band filter (33) connected upstream is present to suppress out of-band signals for the detection of the reception signal levels (39, 19) and both the reception power levels (39, 19) at the output of the reception power level detector (28) and the transmission power levels (5, 9) at the output of the power level detector (6) are supplied separately to the microprocessor with memory (20) to control the controllable antenna combiner (11) (FIG. 8); and/or in that
- a further frequency mixer (31a) is, however, present for a separate frequency conversion of the transmission or reception signals, with the signals at the transmission signal port (16) being supplied to the frequency mixer (31) and the signals at the reception signal port (17) being supplied to the further frequency mixer (31a) and with both output signals of the frequency mixers (31, 31a) being supplied to the microprocessor with memory (20) for a simultaneous direct determination of the transmission frequency channel, of the transmission power level (5), of the reception frequency channel, and of the reception power level (35) (FIG. 10); and/or in that
- an IF frequency channel band filter (36) and a power level detector (6) connected downstream thereof are, however, present to relieve the calculation power in the microprocessor with memory (20) and the IF output signals of the frequency mixer (31) are supplied to the IF frequency channel band filter (36) for determining the power level in the power level detector (6) whose display is supplied to the microprocessor with memory (20) in which a frequency search algorithm is stored to control the voltage-controlled oscillator (30) in a manner such that both the transmission channel frequency and the reception channel frequency are determined and stored from the relationship between the set oscillator frequency, the intermediate frequency, and the power level values (FIG. 12); and/or in that both the reception signals and the transmission signals additionally reduced by the directivity loss at the reception signal port (17) are supplied to the frequency mixer (31); and/or in that the algorithm stored in the microprocessor with memory (20) for controlling the antenna diversity device (1) is designed in a manner such that the test transmission power level (9) is determined on the transmission channel frequency and the test reception power level (19) is determined on the reception channel frequency alternatingly over test cycles and that setting is selected at which the ratio of the reception power level (35) to the transmission power level is the greatest measured over all the test cycles; and/or in that the consecutive test settings of the antenna diversity device 1 for the test steps for determining the settings for a low transmission power level (5) or for a high reception power level (37) in accordance with a predefined algorithm stored in the microprocessor with memory (20) are stored in the microprocessor with memory (20) for the carrying out of a test procedure (FIG. 5); and/or in that no transmission power regulating device is, however, present in the vehicle transceiver device and the bidirectional communication is provided on a transmission/reception channel, with the transmission channel being fixed in the microprocessor with memory (20) during a transmission time slot and with the reception power level 35 being detected during a reception time slot at the associated setting of the oscillator frequency of the voltage-controlled oscillator (30), and with a different setting of the antenna diversity device (!1) being selected during the reception time slots of the bidirectional communication in the antenna diversity device (1) as part of a test procedure in each case in a manner such that the reception power level (35) occurring at every test setting is respectively detected and stored as the test reception power level (19) and a setting of the radiation directivity of the antenna diversity device is selected with reference to the comparison of the test reception power levels (35) with one another at the end of the test procedure at which a larger reception power level (35) is detected (FIG. 6).

The vehicle transceiver device 2 for transmission and reception can be designed for the same frequency channel and the algorithm stored in the microprocessor with memory 20 for controlling the antenna diversity device 1 can be designed in a manner such that on exceeding a predefined transmission/reception level threshold at the output of the power level detector 6, a transmission time slot is recognized during which the setting of the antenna diversity device 1 is given for a smaller transmission power level 5 by the microprocessor with memory 20.

The connection between the first port 14 and the second port 15 can be designed as electrically conductive and the weak coupling of the transmission signal port 16 is provided by a capacitor 19.

A directional coupler 21 having a small insertion loss between its first port 14 and its second port 15 can be present for a directed signal coupling of the power level detector 6 for the determination of the power level and the first port 14 and the second port 15 of the directional coupler 21 can be connected between the radio frequency connector 3 and the combiner signal connector 18 such that the small insertion loss is present between the first port 14 and the second port 15 and the transmission power level 5 reduced by the coupling factor of the directional coupler 2 can be detected by the power level detector 6 at the transmission signal port 16.

A further port designated by a reception signal port 17 for the directed reception of the reception signals reduced by the coupling factor and the transmission signals of the antenna diversity device 1 further attenuated by the directional factor of the directional coupler 21 can be present at the directional coupler 2.

Both the transmission signals and the reception signals at the reception signal port 17 can be supplied to the power level detector 6 and a transmission and reception level threshold can be established in the microprocessor with memory 20 for the bidirectional time-sequential transmission and reception communication on the same frequency channel and the algorithm for controlling the antenna diversity device 1 can be designed in a manner such that on a falling below of the predefined transmission and reception level threshold at the output of the power level detector 6, a reception time slot is recognized during which the setting of the antenna diversity device 1 by the microprocessor with memory 20 is selected as part of a test procedure in consecutive test steps a respective different setting of the antenna diversity device 1 is selected and the reception power level 18 occurring at each test setting of the antenna diversity device 1 is respectively detected and registered as the test reception power level 19 of the vehicle transceiver device 1 and a setting of the antenna diversity device 1 can be selected at the end of the test procedure with reference to the comparison of the test reception power levels 19 with one another, at which setting a greater reception power level 35 is reached and on an exceeding of the predefined transmission and power level threshold, a smaller transmission power level can be reached in accordance with claim 3.

The reception signal reduced by the coupling damping and the transmission signal reduced by the directivity damping of the directional coupler 21 can be taken at the reception signal port 17 and a signal amplifier 22 can be present to which these signals are supplied and which is connected upstream of the power level detector 6 at whose output the test transmission power levels 9 and the test reception power levels 19 are supplied to the microprocessor 20 for a control sequential in time of the controllable antenna combiner 11.

A frequency band filter 33 that is connected upstream of the power level detector 6 can be present to suppress signals outside the frequency band provided for the communication.

To support the dynamic range of the level detection, the latter can be present in a lower intermediate frequency domain, with a frequency mixer 31 being able to be present for this purpose having an oscillator 30 voltage controlled by the microprocessor with memory 20 by which the reception signals and transmission signals are converted to a lower intermediate frequency domain and the level detection for processing in the microprocessor with memory 20 is present in the IF power level detector 6a to which an IF frequency channel band filter 36 is connected upstream.

For the independent frequency coordination of the transmission level detection with an active bidirectional frequency channel in the frequency band, an oscillator 30 can be present which is controlled by the microprocessor with memory 20 and whose oscillator signal and the transmission or reception signals can be supplied to a frequency mixer 31 for frequency conversion into intermediate frequency signals in a lower intermediate frequency domain and the power levels of the intermediate frequency signals detected in the IF power level detector 6 having the IF frequency band filter 36 can be supplied to the microprocessor with memory 20 by whose frequency control of the oscillator 30 the signal content of the individual frequency channels is determined sequentially and the transmission and reception level detection is thereupon coordinated with the active frequency channel.

A selector switch 23 electronically controlled by the microprocessor with memory 20 for an alternating time-sequential forwarding of the transmission or reception signals to the power level detector 6 upstream of which a frequency band filter 33 can be connected to suppress out of band signals can be present for the separate detection of the transmission signals predominantly applied at the transmission signal port 17 in a frequency channel within the frequency band and of the reception signals predominantly applied at the reception signal port 16 in a frequency channel within the frequency band.

A power level detector 6 and a separate reception power level detector 28 having a frequency band filter 33 connected upstream for suppressing out of band signals can be present for the separate detection of the transmission signals predominantly applied at the transmission signal port 17 and of the reception signals predominantly applied at the reception signal port 16 for the detection of the test transmission power levels 9 and of the test reception power levels 19 and both the test reception power levels 19 at the output of the reception power level detector 28 and the test transmission power levels 9 at the output of the power level detector 6 can be supplied separately to the microprocessor with memory 20 to control the controllable antenna combiner 11.

The vehicle transceiver device 2, 2b for transmitting and receiving can be configured for transmitting and receiving on different frequency channels and, to recognize the transmission channel frequency and the reception channel frequency in the microprocessor with memory 20, a frequency search algorithm for controlling a voltage controlled oscillator 30 can be stored in the microprocessor with memory 20 and its oscillator signal with the transmission or reception signals are converted in the frequency mixer 31 31 into ZF output signals at a lower frequency which are supplied to the microprocessor with memory 20, and are analyzed by way of calculation there—the transmission channel frequency and the reception channel frequency can thus also be stored in the microprocessor with memory 20.

A further frequency mixer 31a can be present for a separate frequency conversion of the transmission or reception signals, with the signals at the transmission signal port 16 being able to be supplied to the frequency mixer 16 and the signals at the reception signal port 17) being able to be supplied to the further frequency mixer 31a and with both output signals of the frequency mixers 31, 31a being able to be supplied to the microprocessor with memory 20 for a simultaneous direct determination of the transmission frequency channel, of the transmission power levels of the reception frequency channel, and of the reception power level.

An IF frequency channel band filter 36 and a power level detector 6 connected downstream thereof can be present to relieve the calculation power in the microprocessor with memory 20 and the IF output signals of the frequency mixer 31 can be supplied to the IF frequency channel band filter 36 for determining the power level in the IF power level detector 6a whose display is supplied to the microprocessor with memory 20 in which a frequency search algorithm can be stored to control the voltage-controlled oscillator 30 in a manner such that both the transmission channel frequency and the reception channel frequency can be determined and stored from the relationship between the set oscillator frequency, the intermediate frequency, and the power level values.

For a further relief of the calculation power of the microprocessor with memory 20, an intermediate frequency filter bank 32 can be present having IF frequency channel band filters corresponding to the individual frequency channels of the frequency band that can be connected downstream of the IF output of the frequency mixer 31 and whose filter output signals can be supplied to the microprocessor with memory 20, and the frequency search algorithm stored in the microprocessor with memory 20 can be configured in a manner such that the active channels are determined via the stepwise control of the frequency of the voltage-controlled oscillator 30 by a determination by way of calculation of the transmission levels occurring at the individual channel frequencies in the switch position 24 or of the reception levels are determined by and stored in the microprocessor with memory 20 in the switch position 25.

Both the reception signals and the transmission signals additionally reduced by the directivity loss at the reception signal port 17 can be supplied to the frequency mixer 31.

The algorithm stored in the microprocessor with memory 20 to control the antenna diversity device 1 can be configured in a manner such that, alternatingly, the setting of the antenna diversity device 1 is given for a smaller transmission power level 5 at the transmission channel frequency and the setting of the antenna diversity device 1 is given for a larger reception power level 35 at the reception channel frequency in a cycle sequence.

The algorithm stored in the microprocessor with memory 20 for controlling the antenna diversity device 1 can be designed in a manner such that the test transmission power level 9 is determined on the transmission channel frequency and the test reception power level 19 is determined on the reception channel frequency alternatingly over test cycles and that setting is selected at which the ratio of the reception power level 35 to the transmission power level is the greatest measured over all the test cycles.

The multi-antenna system 12 can include at least two single antennas 34a, 34b and the controllable antenna combiner 11 can include controllable antenna switches 26 and can, on the one hand, be respectively connected to the combiner signal connector 18 and, on the other hand, to a respective at least one of the single antennas 34a, 34b, . . . whose associated switch positions are set in combination via the combiner setting signal 29 of the microprocessor with memory 20 at the control connector 8 so that different radiation directivities are set via different switch positions.

Settable phase rotation elements 27 can be present in the controllable antenna combiner 11 so that the single antennas 34a, 34b, 34c, . . . are combined in a differently settable manner via the settable antenna switches 26 and the settable phase rotation elements 27 and different radiation directivities are set via different switch positions and different settings of the phase rotation elements 27 via the combiner setting signals 29 of the microprocessor with memory 20 at the control connector 8.

The consecutive test settings for the test steps for determining the settings for a low transmission power level 5 or for a high transmission power level 35 in accordance with a predefined algorithm stored in the microprocessor with memory 20 can be stored in the microprocessor with memory 20.

The multi-antenna system 12 can be formed from a number of N>2 vertically polarized monopole antennas 34a, 34b, . . . with the electrically conductive roof of a vehicle as an electrical counterweight of the monopole antennas 34a, 34b, . . . , with the monopole antennas 34a, 34b, . . . being arranged around a central point as a circular group on the lower side of the roof in the vehicle passenger compartment such that substantially a regular n-gon is formed by them.

It is possible that no transmission power level regulating device is present in the vehicle transceiver device and the bidirectional communication is carried out on only one transmission and reception channel, with the transmission channel being fixed in the microprocessor with memory 20 during a transmission time slot and with the reception power level 35 being detected during a reception time slot at the associated setting of the oscillator frequency of the voltage-controlled oscillator 30, and with a different setting of the antenna diversity device 1 being selected during the reception time slots of the bidirectional communication in the antenna diversity device 1 as part of a test procedure in consecutive steps in each case in a manner such that the reception power level 35 occurring at every test setting is respectively detected and stored as the test reception power level 19 and a setting of the radiation directivity of the antenna diversity device is selected with reference to the comparison of the test reception power levels 19 with one another at which a larger reception power level 35 is detected.

The great advantage achieved with the present invention comprises an antenna diversity device 1 being able to be connected to the high frequency connector 3 of a predefined transceiver device 2 and, without being controlled by the transceiver device 2 in a special manner by control signals, independently carrying out the setting of the antenna diversity device by successive test settings with the result of configuring the bidirectional digital communication more effectively, i.e. e.g. with a smaller bitter error rate in the reception signal. In this respect, the antenna diversity device 1 can be configured as broadband as part of the predefined frequency bandwidth (e.g. 70 MHz) so that the setting of the antenna diversity device 1 and thus the directivity of the multi-antenna system 12—via the control of the antenna combiner 12—leads to the desired reduction of the bit error rate without a presetting of the antenna diversity device 1 to the frequency of the active frequency channel or of the active frequency channels on which communication takes place. In accordance with the invention, the quality of the bidirectional communication link that is expressed in the transmission power level 5 of the predefined transceiver device 2 serves as the basis for the control of the antenna diversity device 1. The relationship between the quality of the bidirectional communication link and of the output transmission power level 5 can be differently derived in the predefined transceiver device 2 here from the magnitude of the reception signal, the bit error rate in the reception signals, or a similar criterion. The relationship is of particular importance for the present invention that a transmission power level regulating device 4 is configured in the transceiver device 2 in a manner such that as the quality of the communication link falls, the transmission power level 5 is set greater and, conversely, is lowered as the quality of the communication link increases.

A further advantage of the antenna diversity device 1 in accordance with the invention is also present when the transmission frequency channel and the reception frequency channel differ in frequency and the transmission and reception take place simultaneously. The system also finds a respective setting due to the variety of the possible radiation directivities that brings about an improvement of the transmission quality with respect to the use of a single antenna even though a separate ideal setting for transmission and reception respectively is not possible.

Figure 2:
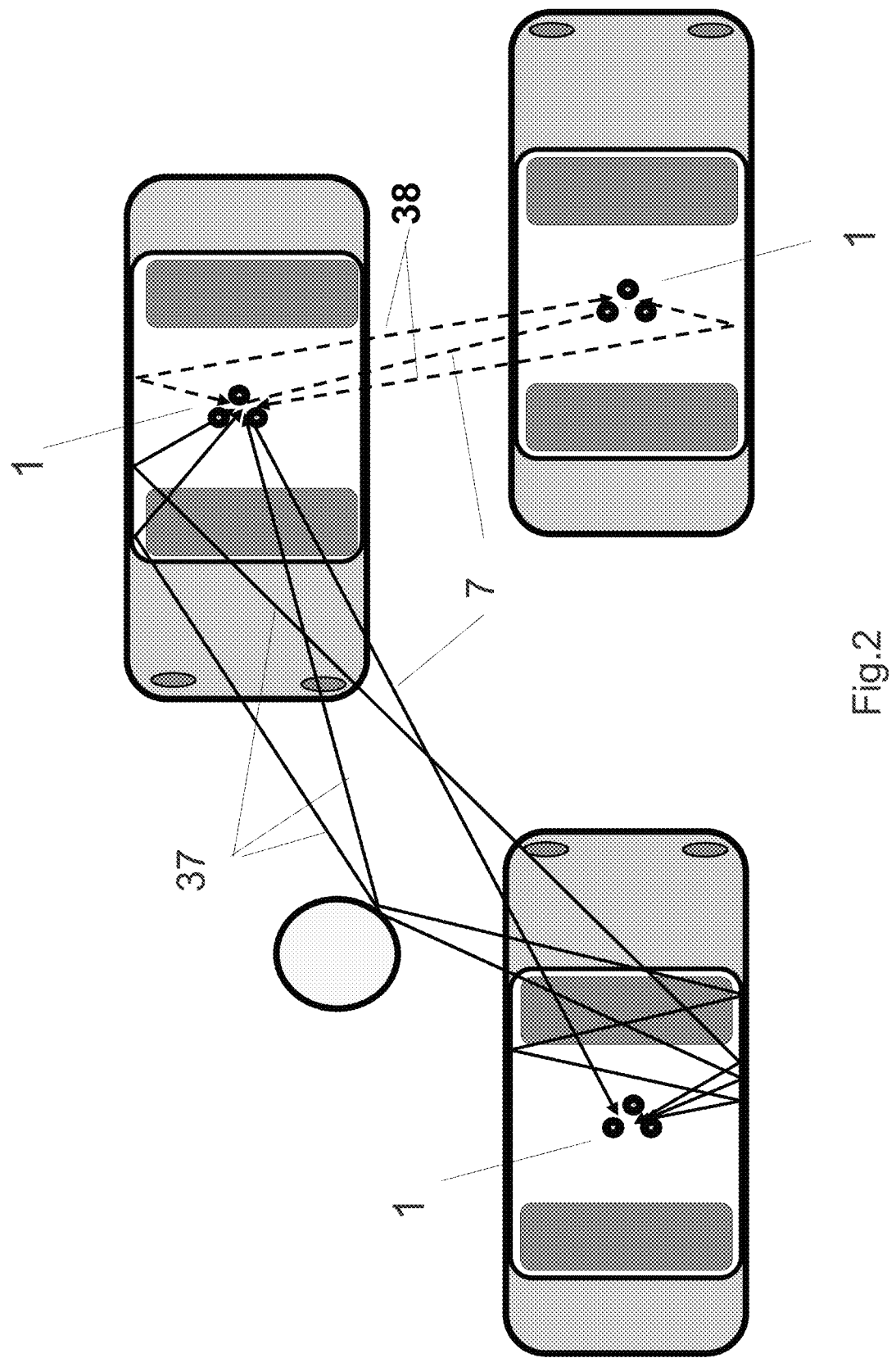

The control and the reaching of different settings for the radiation directivity of the multi-antenna system 12 can be achieved in a large number of different ways. For example, by alternate switching on of differently placed antennas on the vehicle or by different settings of controllable antenna switches 26 and controllable phase rotation elements 37 selected via the controllable antenna combiner 1, and by a large number of further possible diversity arrangements of combiner multi-antenna systems 11, 12. A simple multi-antenna system 12 can—as FIG. 2 shows—be formed, for example, from three vertical monopole antennas at suitable spacings from one another on the lower side of the roof— that is in the passenger compartment—of a vehicle. In accordance with the invention, these monopole antennas are arranged as a circular group having a circle diameter of, for example, 0.2-0.75λ (free wavelength) about a central point, preferably in the middle area of the vehicle roof. It is required here that the vehicle roof is configured as metallically conductive at least in a range of a plurality of free wavelengths A. In a simple case, the circular group comprises four monopole antennas, as shown in FIG. 2. Different directivities of the multi-antenna system 12 can already be set by alternate or combined switching on of the single antennas 34a, 34b, 34c via the switches 26 in the controllable antenna combiner 11—as in FIGS. 3 and 4, for example—due to the path differences of the electromagnetic waves. The diversification of the directivities can be substantially further increased if controllable phase rotation elements Φ, 27—as in FIG. 5—and optionally amplitude setting elements A, 39—as indicated in FIGS. 6-12—by which the antennas 34a, 34b, 34c are combined and controllably connected are additionally present in the controllable antenna combiner 11. The antenna diversity device 1 independently searches for a setting of the radiation directivity favorable for the moment to improve the quality of the bidirectional communication with the aid of the provided empirically selected test settings of the antenna combiner 11. A radiation directivity favorable for the moment is directed less to a main lobe of the radiation directional pattern in the direction toward the communication partner, but rather to the positive summary superposition of all the waves incident from the different spatial directions due to the multipath propagation or transmitted into the different directions.

The invention is explained further in the following with reference to some embodiments in the Figures.

Figure 3:
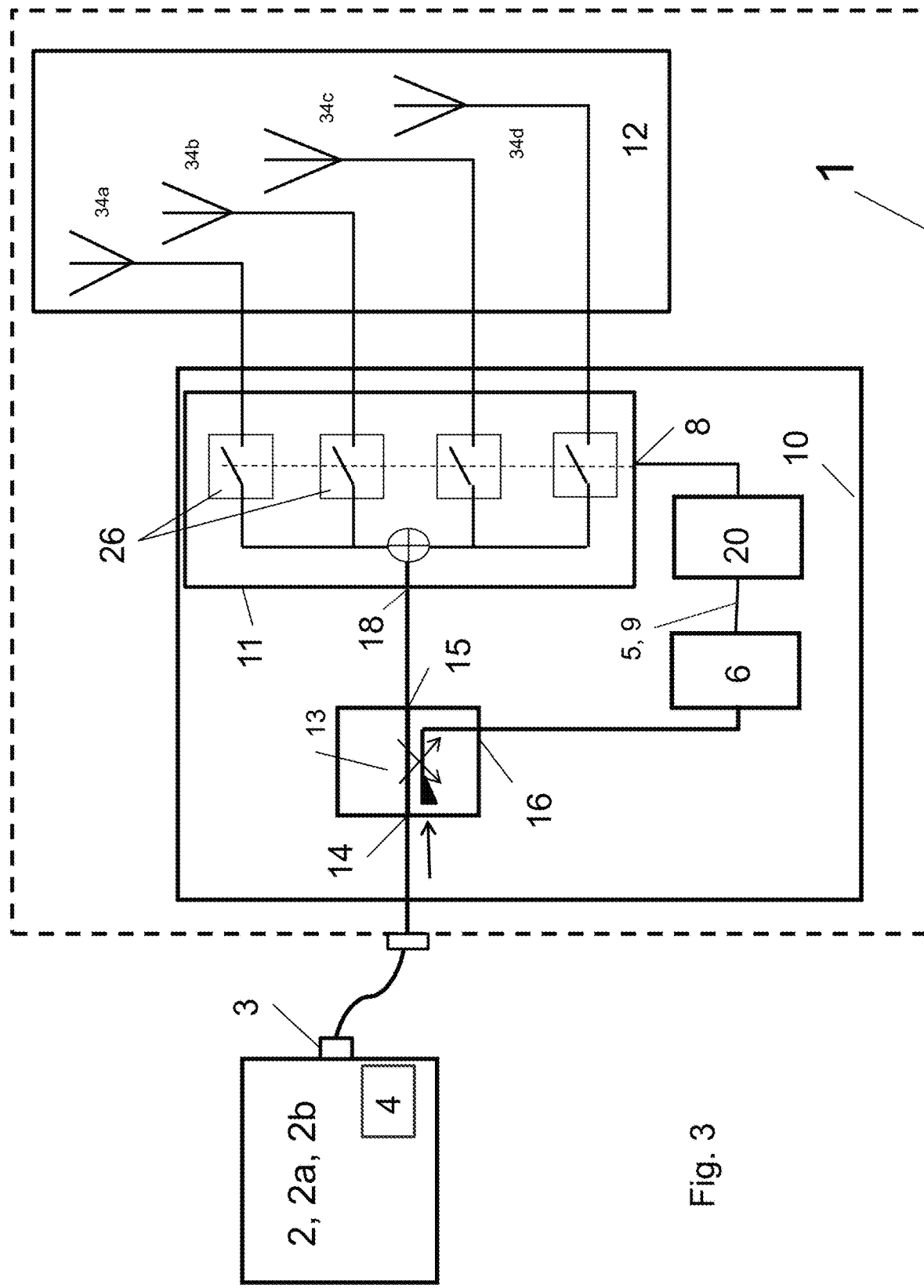

There are shown:

FIG. 1: example of a scenario of bidirectional vehicle-to-vehicle communication between three vehicles each having an antenna in accordance with the prior art on the vehicle roof. The stretched lines describe the propagation paths of the electromagnetic waves between a first vehicle and a second vehicle in a first frequency channel. The dashed lines correspondingly describe the propagation between the first vehicle and a third vehicle in a different frequency channel. The representation illustrates the contributions of the diversion waves 37 to the direct waves 7 and of the diversion waves in their own vehicle as already described further above;

FIG. 2: an example of a scenario of bidirectional vehicle-to-vehicle communication between three vehicles as in FIG. 1, but with an antenna diversity device 1 in accordance with the invention with the example of a simple multi-antenna system 12 comprising three vertical monopole antennas located on the vehicle roof and placed at suitable spacings from one another. The multipath propagation shown illustrates the circumstance that the formation of a main lobe of the directional pattern in the direction of that vehicle by which the bidirectional communication takes place very frequently does not allow any favorable setting of the directivity of the multi-antenna system 12 to be expected;

FIG. 3: an antenna diversity device 1 in accordance with the invention designed as broadband for the total frequency range for a transceiver device 2 having a transmission power level regulation device 4 that is selectively configured as a transceiver device 2a for a frequency channel for transmission and reception sequentially in consecutive time slots or as a transceiver device 2b for simultaneous transmission and reception in different frequency channels. The antenna diversity device 1 is connected to the radio frequency connector 3 whose signals are supplied to the diversity control device 10. The latter includes the controllable antenna combiner 11 with switches 26 by which the multi-antenna system 12 comprising the antenna elements 34a, 34b, ... 34d is set. The radio frequency signals at the radio frequency connector 3 are connected via the first port 14 and the second port 15 of a multiport coupling element 13 connected thereto via the backbone with low transmission loss to the combiner signal connector 18 of the controllable antenna combiner 11 for transmission or reception. The multiport coupling element 13 has a further port that is called a transmission signal port 16 and that is loosely coupled to the backbone with a coupler loss of, for example 10 dB for the decoupling of the transmission signal of the transceiver device 2 and for forwarding to the power level detector 6. The transmission power level 5 detected at the power level detector 6 is evaluated and stored in the microprocessor with memory 20. An algorithm for controlling the controllable antenna combiner 11 is stored in the microprocessor with memory 17 via whose control connector 8 a different setting of the controllable antenna combiner 11 is selected during the bidirectional communication as part of a test process in consecutive test steps, in each case in a manner such that the transmission power level 5 produced at each test setting is respectively detected and stored as a test transmission power level 9 of the transceiver device 2 and a setting of the antenna diversity device 1 by which a smaller transmission power level 5 is detected is selected with reference to the comparison of the test transmission power levels 9 between one another at the end of the test procedure. In this embodiment of the antenna diversity device 1, no selective elements restricted in frequency to the active communication frequency channel are included. Due to the magnitude differences between the transmission signal and the reception signal, the latter negligibly contributes on the detection of the level at the detector 6. The system thus always searches over the plurality of setting possibilities for a setting of the antenna combiner 11 whose associated antenna directivity over the transmission and reception path achieves a transmission power level 5 that is as low as possible and thus achieves a high quality of the communication link with a small bit error rate in the reception signal;

FIG. 4: an antenna diversity device 1 in accordance with the invention configured as broadband as in FIG. 3 with a particularly simply configured multiport coupling element 13 that is configured in the form of a continuously conductive connection as a backbone between the first port 14 and the second port 15 and the loose coupling of the transmission signal port 16 is given by a capacitor 19. To suppress interference outside the frequency band, the power level detector 6a is selectively configured in a manner such that a frequency band filter 33—for example with the frequency bandwidth of 70 MHz—is connected upstream of the power level detector 6;

FIG. 5: an antenna diversity device 1 in accordance with the invention configured as broadband as in FIG. 4, but with the special difference that initially as part of test processes a setting of the controllable antenna combiner 11 is found for a favorable directivity of the multi-antenna system 12 for the transmission mode using the search for small transmission power levels 5 to subsequently effect as part of test processes a setting of the controllable antenna combiner 11 for a favorable directivity of the multi-antenna system 12 for the reception mode using the search for large reception power levels 35. It is thus necessary, on the one hand, for the corresponding control of the controllable antenna combiner 11 to detect both the presence of the transmission mode or the reception mode and the transmission power level 5 and the reception power level 35 separately in the microprocessor with memory 20 and to control the controllable antenna combiner 11 correspondingly. The separate setting of the directivity of the multi-antenna system 12 for the transmission mode and the reception mode is naturally restricted to the fact that the transmission mode and the reception mode are present during different times. In the present broadband embodiment, the antenna diversity device 1 is not reliant on the knowledge of the transmission frequency channel and of the reception frequency channel. Both frequency channels can thus be the same as or different from one another.

For this purpose, the multiport coupling element 13 is configured as a directional coupler 21, with the first port 14 and the second port 15 in the main branch with small insertion loss and with at least one further port designated as a reception signal port 17 with corresponding coupling loss (for example 10 dB) for removal of the reception signals applied at the controllable antenna combiner 11. With respect to the radio frequency connector 3, the levels of the transmission signals at this port are present reduced by the summation of coupling loss and directional loss of the directional coupler 21 (that is, for example, by 40 dB). The level of the transmission signals at the radio frequency connector 3 of the transceiver device 2 exceeds the reception signal at the combiner signal connector 18 by a plurality of orders of magnitude. The reception signal port 17 is thus suitable to provide both the transmission signal and the reception signal in the range of similar orders of magnitude. A signal amplifier 22 is connected upstream of the frequency band-selective power level detector 6a due to the small levels of the reception signals. Although the transmission power level 5 considerably exceeds the reception power level 35 at the reception signal port 17, the dynamic range for the level detection of transmission and reception signals can be sufficiently configured with this arrangement. This magnitude difference of the signal levels is respectively recognized in accordance with the invention in the microprocessor with memory 20 as a criterion for the presence of the transmission mode or of the reception mode. In accordance with the invention, the algorithm stored there controls the controllable antenna combiner 11 and thus the directivity of the multi-antenna system 12 for the transmission mode and the reception mode with reference to the association of the transmission power level 5 and the transmission time slot or the reception power level 35 and the reception time slot via the control connector 8;

FIG. 6: an antenna diversity device 1 in accordance with the invention as in FIG. 5, but with the difference that the transceiver device 2 is configured for transmission and reception on one and the same frequency channel (transmission and reception channel) that is, however any desired within the frequency band.

Figure 7:
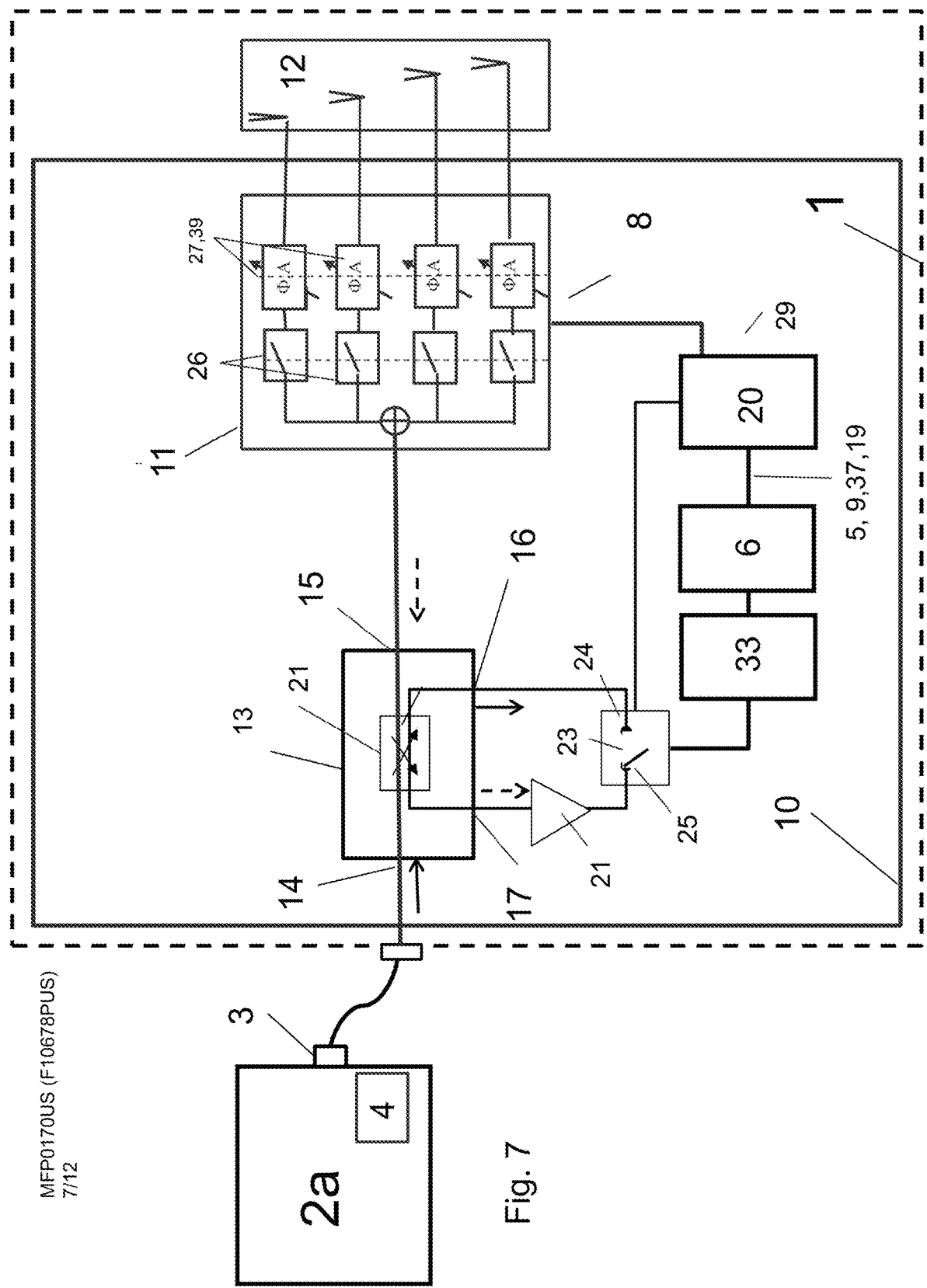

For the simpler and more exact detection of the power levels and to satisfy the demand on the level dynamics in the detection, they are not carried out in their original frequency location—of 5.9 GHz, for example—for the transmission and reception signals. In accordance with the invention, these signals are converted to an intermediate frequency for which IF frequency channel end filters 36 having the frequency bandwidth of a frequency channel—of 10 MHz, for example—are economically favorably available. In this manner, the frequency band filter 33 that is more complicated to implement and that is included in FIGS. 4 and 5 can be dispensed with. However, this procedure includes the conversion of the signals at the output of the signal amplifier 22 in the frequency mixer 31 with the aid of the signal of an oscillator 30 (VCO) voltage controlled in frequency. The frequency of the oscillator 30 is changed in search steps with the aid of the algorithm stored in the microprocessor with memory 20 in a manner such that the transmission signals converted in frequency are in the transmission range of the IF frequency channel band filter 36 and are determined by the detector with the microprocessor with memory 20 connected downstream and the detection is thus automatically coordinated with the active frequency channel by a sequential query;

FIG. 7: the Figure shows in a further advantageous embodiment of the invention an antenna diversity device 1 in accordance with the invention configured as broadband in frequency as in FIG. 5, but with the difference that the transmission signals are now tapped at the transmission signal port 16 of the multiport coupling element 13 that are supplied to the two connectors of a controllable switch 23 together with the reception signals tapped at the reception signal port 17. The transmission signal and the reception signal are selectively supplied to the power level detector 6, controlled by the microprocessor with memory 20, with the aid of the controllable switch 23. A frequency band filter 33 whose transmission frequency range corresponds to the frequency bandwidth (e.g. 70 MHz) that comprises all the frequency channels is connected upstream of said power level detector 6 for protection from interference outside the frequency band. The algorithm stored in the microprocessor with memory 20 controls the switch 23, starting with the transmission level switch position 24, and delivers corresponding combiner setting signals to the control connector 8 of the controllable antenna combiner 11 as part of a test cycle to find a combiner setting for which a particularly small transmission power level 5 is detected. Consequently, the algorithm in the microprocessor with memory 20 then causes the switching of the switch 23 into the reception level switch position 25 and searches for corresponding combiner setting signals 29 as part of a test cycle to find a combiner setting for which a particularly large reception power level 35 is detected. To prevent incorrect settings of the controllable antenna combiner 11 as a consequence of too small a selection of transmission and reception signals at the ports 17 and 16, a particularly high directional loss is to be demanded for the directional coupler 21, in particular against the occurrence of transmission signals at the reception signal port 17.

Figure 8:
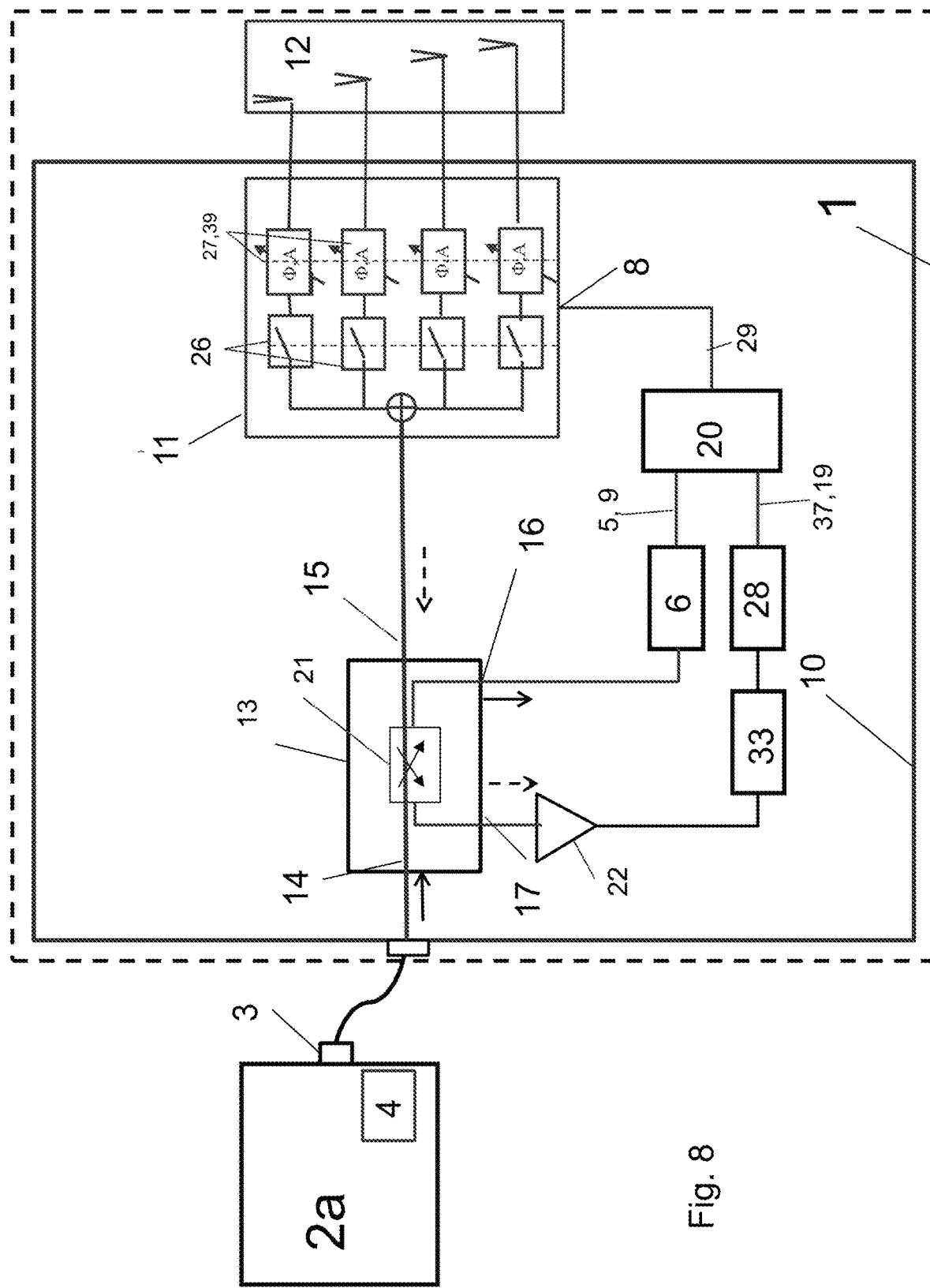
Figure 9:
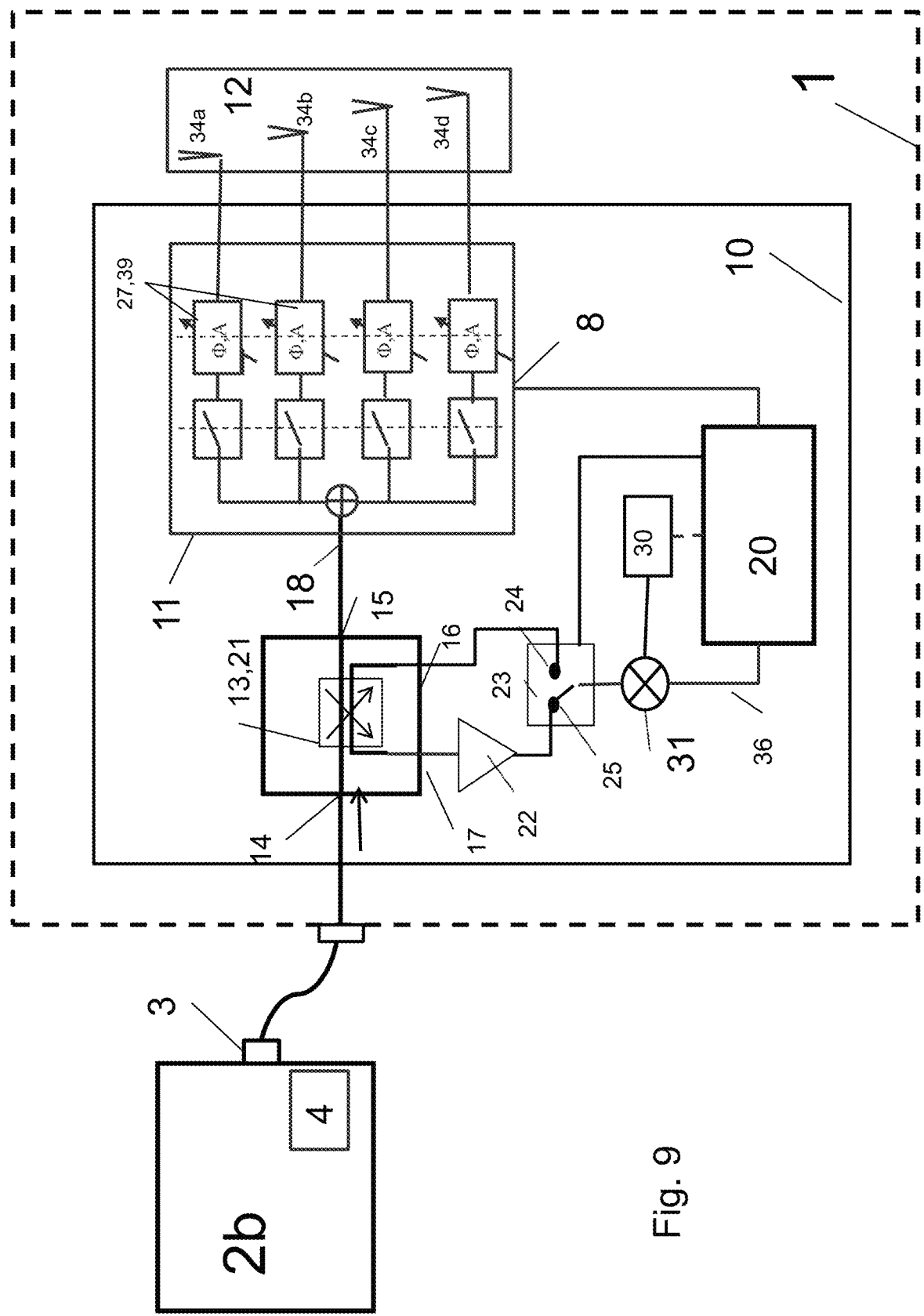
Figure 10:
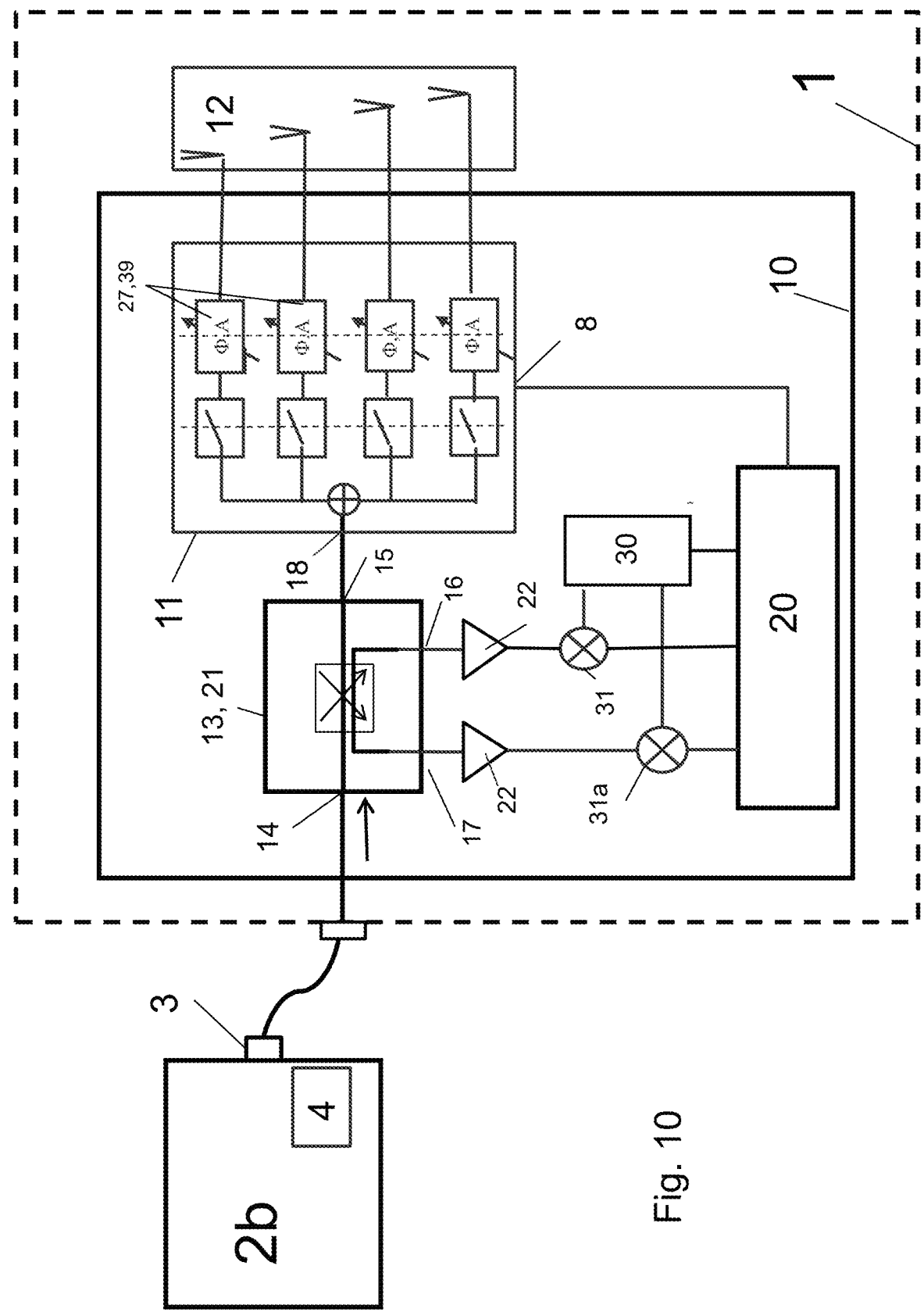
Figure 11:
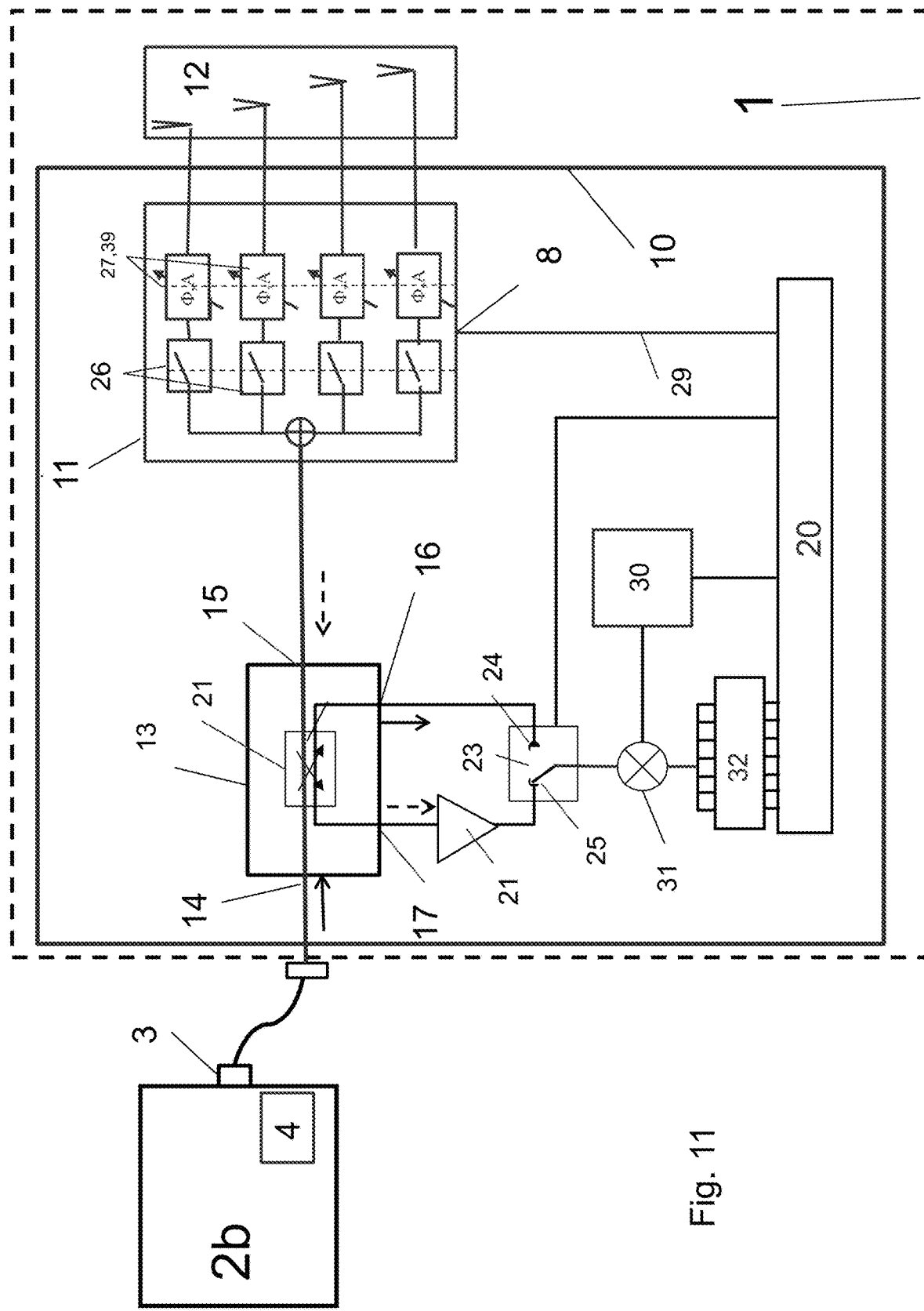

Due to the broadband arrangement in the frequency, the bidirectional communication for transmission and reception can take place on one and the same frequency channel alternately in consecutive time slots and the controllable antenna combiner 11 can be set in each case accordingly for minimal transmission power levels 5 or maximum reception power levels 35 during these time slots. The bidirectional communication can equally take place on different frequency channels as desired for transmission and reception in respective associated time slots. The determination of the transmission mode or reception mode can also take place here in accordance with the invention in the microprocessor with memory 20 in each of the two cases with reference to the occurrence of the larger transmission power level 5 in comparison with the smaller reception power level 35;

FIG. 8: the Figure shows, in a further advantageous embodiment of the invention, an antenna diversity device 1 configured as broadband in frequency in accordance with the invention, as in FIG. 7, but with the difference that separate reception power level detectors 28 are present for the detection of the transmission signals of the power level detector 6 and for the detection of the reception signals. For this purpose, the transmission and reception signals at the transmission signal port 16 or at the reception signal port 17 are not supplied to the switch 23, as in FIG. 7, but rather to the corresponding detectors for simultaneous detection. For protection against interference reception signals outside the frequency band the frequency band filter 33 whose transmission frequency channel comprises all the frequency channels is connected upstream of the reception power level detector 28 in this example. The recognition that the transmission mode and the reception mode is given in the microprocessor with memory 20 via the magnitude comparison of the power levels at the output of the detector 6 or of the reception power level detector 28. The simultaneously occurring determination of the transmission power levels 5 and of the reception power levels 35 make algorithms possible according to which an ideal setting of the controllable antenna combiner 11 is found for both communication directions via test procedures;

FIG. 9: the Figure shows, in a further advantageous embodiment of the invention, an antenna diversity device 1 configured as broadband in frequency in accordance with the invention, as in FIG. 7, but with the difference that the transmission or reception signals at the output of the switch 23 are detected by frequency conversion in the frequency mixer 31 in a low frequency position. The signals in this frequency position are not detected by a separate detector 6, as in FIG. 7, bur are rather directly supplied to the microprocessor with memory 20 for an analysis and detection by way of calculation. The algorithm in the microprocessor with memory 20 controls the frequency of the voltage-controlled oscillator 30, whose output signal in the frequency mixer 31 is superposed on the transmission and reception signals, stepwise as part of a search process in a manner such that all the active transmission and reception frequency passages and also the signals located therein are recognized and registered in accordance with the level;

FIG. 10: the Figure, shows in a further advantageous embodiment of the invention, an antenna diversity device 1 in accordance with the invention, as in FIG. 9, but with the difference that the transmission and reception signals at the transmission signal port 16 or at the reception signal port 17 are detected in a low frequency position separately in each case by frequency conversion in the frequency mixer 31 or in the frequency mixer 31a. Both signals are supplied in this frequency position to the microprocessor with memory 20 for separate analysis and detection. The frequency conversion of the transmission signals tapped at the transmission signal port 16 takes place in the frequency mixer 31 while the output voltage of the voltage-controlled oscillator 30 controlled by the microprocessor with memory 20 is superposed and the frequency conversion of the transmission signals tapped at the reception signal port 17 takes place in the frequency mixer 31*a* while the output voltage of the voltage-controlled oscillator 30*a* likewise controlled by the microprocessor with memory 20 is superposed. The algorithm in the microprocessor with memory 20 controls both the frequency of the voltage-controlled oscillator 30 or of the oscillator 30*a*—whose output signal in the frequency mixer 31 is superposed in each case on the transmission and reception signals—stepwise as part of a search process in a manner such that all the active transmission and reception frequency channels and also the signals located therein are recognized and registered in accordance with the level;

The advantage is associated with this arrangement that on the presence of a multichannel transceiver device 2*b* for a plurality of simultaneously active frequency channels both the frequency channels under the transmission mode and the frequency channels under the reception mode are separately recognized and the bidirectional communication processes can be optimized averaged over all the frequency channels using the configuration of a suitable algorithm for setting the controllable antenna combiner 11;

FIG. 11: the Figure shows, in a further advantageous embodiment of the invention, an antenna diversity device 1 in accordance with the invention, as in FIG. 9, but with the difference that the signals in the low frequency position are not supplied directly to the microprocessor with memory 20 for analysis and detection. The signals are rather filtered after the frequency mixer 31 in a filter bank 32 in which a series of filters each having the frequency bandwidth of a frequency channel in the low frequency position are associated corresponding to the frequency channels within the frequency band. By a suitable setting of the oscillator frequency of the voltage-controlled oscillator 30 by the microprocessor with memory 20, the transmission content of all the frequency channels in the low frequency position are applied at the filter in the transmission level switch position 24 of the switch 23 and are simultaneously supplied at the output of said filter for all the frequency channels in separately associated form to the microprocessor with memory 20. The filtering of the transmission signals in the different frequency channels in the low frequency position in the already known frequency substantially relieves the microprocessor with memory 20 in the analysis and detection of the transmission signals by calculation. The detection of the reception signals takes place in a similar manner by switching the switch 23 into the reception level switch position 25 by the microprocessor with memory 20. The antenna diversity device 1 is thus suitable in a fast manner of work to support the total bidirectional communication over a plurality of frequency channels using the level detections; and FIG. 12: the Figure shows, in a further advantageous embodiment of the invention, an antenna diversity device 1 in accordance with the invention, as in FIG. 9, but with the difference that the lower frequency position is selected as the intermediate frequency so that associated IF frequency channel band filters 36 are economically favorably available and can be used. Such a band filter 36 is connected downstream of the frequency mixer 31. The oscillator frequency of the voltage controlled oscillator 30 is set by the microprocessor with memory 20 in a manner such that the transmission and reception signals converted in frequency fall into the transmission range of the IF frequency channel band filter 36. The output signal of the IF frequency channel band filter 36 is detected in the power level detector 6 and the transmission power level 5 and the reception power level 35 are supplied to the microprocessor with memory 20 via the switch 23, controlled by said microprocessor with memory 20. The coordination of the antenna diversity device 1 to query the signal content of the individual frequency channels takes place, controlled by the algorithm in the microprocessor with memory 20, by a sequential control of the voltage-controlled oscillator 30. Unlike the antenna diversity device 1 in FIG. 9, the microprocessor with memory 20 is relieved of analyzing and detecting by way of calculation the signal in the lower frequency position supplied to it. This results in a substantial shortening of the calculation time and thus of the setting time of the controllable antenna combiner 11.

The advantageous action of an antenna diversity device 1 in accordance with the invention can be explained in a similar manner to the already described arrangement in accordance with the invention of e.g. for monopole antennas on the lower side of a vehicle roof—that is in the passenger compartment of the vehicle. The already described arrangement of the monopole antennas in a circular group around a center point below the roof skin of the vehicle that is at least electrically conductive in the perimeter over some wavelengths A already produces said advantages with a low-effort controllable antenna combiner 11 only formed from switches 26. The length of every monopole antenna can amount to approximately ¼ λ and enables, at approximately 12 mm and at a frequency of approximately 6 GHz, the accommodation beneath the roof covering (headliner) of the vehicle.

The effect of the antenna diversity device 1 can be explained as follows. The azimuthal directional pattern of every individually connected monopole antenna—measured in a reflection-free radome on a revolving vehicle stand—is admittedly an omnidirectional effect in a certain manner due to the almost central position in the vehicle, but fans out in the total azimuth into a plurality of radiation lobes each having a radiation maximum, whereby deep radiation losses of in part up to 20 dB are adopted between azimuthally adjacent radiation maxima with respect to the adjacent radiation maximum. The mean azimuthal angular spacing between the adjacent radiation losses amounts to a few angular degrees at this frequency on average. These radiation losses result due to destructive superpositioning of the waves 38 reflected and diffracted at the vehicle. They in particular include the window openings with their reflective window pillars. The fanning out results in dependence on the configuration of the vehicle in the region of the window pillars and also from the curvature of the vehicle roof, etc.

A similar radiation pattern results for a similarly configured monopole antenna that is attached below the vehicle roof in a horizontally offset manner by a wavelength of approximately 0.2λ to 0.75λ. Its radiation losses are, however, as a rule displaced in the azimuth with respect to the monopole antenna in the preceding position. It is thus possible in accordance with the invention using an antenna diversity device 1 having a plurality of monopole antennas in the event of an occurrence of a radiation loss at one of the monopole antennas to cover this radiation loss by switching to another antenna at a suitable spacing by its radiation lobe. A multi-antenna system 12 for a particularly low-effort antenna diversity device 1 in accordance with the invention comprises—as described above—4 monopole antennas. On a separate measurement of the azimuthal directional patterns of the 4 monopole antennas and a formation of the directional pattern from the respective largest azimuthal measurement value of the 4 monopole antennas, a more-or-less omnidirectional pattern results with insignificant radiation losses. This omnidirectional radiation pattern is available for a diversity device by selecting the respective best suited antenna. The remaining waviness of the omnidirectional radiation pattern due to superposition of the individual directional patterns of the monopoles with reference to the measurements on the revolving vehicle stand can also be further reduced in accordance with the invention by an adjusting, slight deviation from the regular arrangement of the monopoles in the circular group. The search process for a favorable setting of the antenna diversity device 1 in accordance with the invention during the bidirectional communication is promoted by these measures and results—also on an additional influencing due to detour waves 37 from the vehicle environment (see FIG. 2)—in advantageously short setting times on average.

In an advantageous further development of the invention, the multi-antenna system 12 therefore comprises a number of N>2 vertically polarized monopole antennas 34a, 34b, . . . that are arranged on the lower side of the roof in the vehicle passenger compartment around a central point as a circular group having a circular diameter approximately between 0.2λ and 0.75λ such that a regular n-gon is substantially formed by them. The monopole antennas are excited with respect to the electrically conductive vehicle roof. The electrically conductive, substantially horizontally oriented vehicle roof thus serves as an electrical counterweight to the monopole antennas 34a, 34b, . . . Electrically low monopole antennas are in this connection by no means limited in shape to the rod shape, but can rather comprise structures that largely differ therefrom and that are excited in a monopolar manner with respect to the metallic roof.

The diversification of the antenna diversity device 1 can be increased and the remaining waviness of the radiation patterns of the individual monopole antennas shown superposed can thus also be further reduced when the number of monopoles in the circular group or beyond this a plurality of circular groups of monopole antennas 34a, 34b, . . . are concentrically arranged and if furthermore controllable phase rotation elements 27 controllable in controllable antennas 11 (see FIG. 5) are present, optionally with controllable amplitude elements 39 (see FIG. 6).

On the presence of a transceiver device 1 having two radio frequency connectors 3, 3a, for which a respective antenna is provided for a diversity effect. a respective antenna diversity device 1 in accordance with the invention can be connected. It is required here that it applies to each of the two radio frequency connectors 3 that, during the bidirectional communication over the respective radio frequency connector, the transmission power level (5) is set larger as the quality of the communication link falls and is conversely lowered as the transmission quality of the communication link increases.

Each of the two antenna diversity devices 1 independently searches in accordance with the invention for a setting of the controllable antenna combiners 11 to improve the quality of communication during the communication link over the respective radio frequency connector 3, 3a. This, for example, enables the arrangement of two associated multi-antenna systems 12 as circular groups of monopole antennas 34a, 34b, . . . at different points below the vehicle roof, for example in the front and rear regions.

The improvement of the bidirectional communication in accordance with the invention can in special cases, however, also be achieved if a transmission power level regulation device is not present in the vehicle transceiver device 2 and if the bidirectional communication is provided on one transmission and reception channel, i.e. the transmission and reception takes place on the same frequency channel, that is a single-channel transceiver apparatus 2b is present. An arrangement suitable for this purpose is described in connection with FIG. 6. The bidirectional communication on the transmission and reception channel is, as described above, processed in consecutive transmission and reception time slots. During a transmission time slot, the transmission and reception channel is determined in the microprocessor with memory 20 using the stepwise search for the suitable oscillator frequency of the voltage controlled oscillator 30. The reception power level 35 is detected using the associated setting of the oscillator frequency during a reception time slot of the reception power levels 35. A different setting of the antenna diversity device 1 is selected during the reception time slots of the bidirectional communication as part of a test procedure in consecutive test steps in the antenna diversity device 1, respectively in a manner such that the reception power level 35 occurring at each test setting is respectively detected and stored as the test reception power level 19. A setting of the radiation directional effect of the antenna diversity device is selected using the comparison of the test reception power levels 35 among one another at the end of the test procedure, by which antenna diversity device a greater reception power level 35 is detected, whereby the quality of the bidirectional communication is improved.

REFERENCE NUMERAL LIST 1 antenna diversity device
2 transceiver device
2a single-channel transceiver device
2b multi-channel transceiver device
3 radio frequency connector
4 power level regulation device
5 transmission power level
6 transmission power detector
7 directly incident wave
8 control connector
9 test transmission power level
10 diversity control device
11 controllable antenna combiner
12 multi-antenna system
13 multiport coupling element
14 first port
15 second port
16 transmission signal port
17 reception signal port
18 combiner signal connector
19 test reception power level
20 microprocessor with memory
21 directional coupler
22 signal amplifier
23 controllable switch
24 transmission level switch position
25 reception level switch position
26 controllable antenna switch
27 controllable phase rotation element
28 reception power level detector
29 combiner setting signals
30 voltage-controlled oscillator
31 frequency mixer
32 intermediate frequency filter bank
33 frequency band filter
34a, 34b, 34c, . . . antenna structures
35 reception power level
36 IF frequency channel band filter
37 diversion wave
38 wave reflected and diffracted at the vehicle
39 controllable amplitude setting elements

The invention claimed is:

1. An antenna device for a vehicle for a vehicle transceiver device whose transmission power level regulation device is configured in a manner such that, during the bidirectional communication, the transmission power level is set as larger as the quality of the communication link drops and is conversely lowered as the transmission quality of the communication link increases, comprise the following features the antenna device is configured as an antenna diversity device having a plurality of antenna elements in a manner such that a plurality of diversity settings can be selected for a selection of different radiation directivities for transmission and for reception;

the antenna diversity device is connected to the radio frequency connector of the vehicle transceiver device;

a power level detector is present in the antenna diversity device and the transmission power level of the vehicle transceiver device is detected and constantly registered by it; and to increase the transmission quality of the communication link, a setting of the antenna diversity device is selected at which a smaller transmission power level is reached after an alternatingly carried out selection of a respective different setting of the antenna diversity device and a detection of the transmission power level present at this setting.

2. An antenna diversity device in accordance with claim 1, wherein during the bidirectional communication in the antenna diversity device, a different setting of the antenna diversity device is selected as part of a test procedure in consecutive test steps in a respective manner such that the transmission power level occurring at each test setting is respectively detected and stored as a test transmission power level of the vehicle transceiver device and a setting of the antenna diversity device is selected with reference to the comparison of the test transmission power levels with one another at the end of the test process at which a smaller transmission power level is detected.

3. The antenna diversity device in accordance with claim 1, wherein the following components are included in the antenna diversity device:

a multi-antenna system comprising a plurality of antenna elements on the vehicle;

a diversity control device having the following assemblies:

at least one controllable antenna combiner having the combiner signal connector and having the control connector for a controlled setting of different radiation directivities of the multi-antenna system to which the antenna elements of the multi-antenna system are connected;

a low-loss multiport coupling element whose first port is connected to the radio frequency connector of the vehicle transceiver device and whose second port is connected to the combiner signal connector, with a strong coupling being present between the first port and the second port and at least one further port, called the transmission signal port, with a weak coupling to the first port;

a power level detector that is connected at the input side to the transmission signal port;

at least one microprocessor with memory that is connected at the input side to the output of the power level detector and at the output side to the control input of the controllable antenna combiner; and an algorithm is stored in the microprocessor with memory to control the controllable antenna combiner by which a respective smaller transmission power level is displayed by the power level after the end of a test procedure.

4. The antenna diversity device in accordance with claim 1, wherein the vehicle transceiver device is designed for transmission and reception on the same frequency channel and the algorithm stored in the microprocessor with memory for controlling the antenna diversity device can be designed in a manner such that on exceeding a predefined transmission/reception level threshold, a transmission time slot is recognized at the output of the power level detector during which the setting of the antenna diversity device is given for a smaller transmission power level by the microprocessor with memory.

5. The antenna diversity device in accordance with claim 1, wherein a directional coupler having a small insertion loss between its first port and its second port is present for a directed signal coupling of the power level detector for the determination of the transmission power level and the first port and the second port of the directional coupler are connected between the radio frequency connector and the combiner signal connector such that the small insertion loss of the directional coupler is present between the first port and the second port and the transmission power level reduced by the coupling factor of the directional coupler is detected at the transmission signal port by the power level detector.

6. The antenna diversity device in accordance with claim 5, wherein a further port designated as a reception signal port is present at the directional coupler for the directed reception of the reception signals of the antenna diversity device reduced by the coupling factor and of the transmission signals further attenuated by the directional factor of the directional coupler.

7. The antenna diversity device in accordance with claim 3, wherein a directional coupler having a small insertion loss between its first port and its second port is present for a directed signal coupling of the power level detector for the determination of the transmission power level and the first port and the second port of the direction coupler are connected between the radio frequency connector and the combiner signal cone tor such that the small insertion loss of the directional coupler is present between the first port and the second port and the transmission power level reduced by the coupling factor of the directional coupler is detected at the transmission signal port by the power level detector, wherein a further port designated as a reception signal port is present at the directional coupler for the directed reception of the reception signals of the antenna diversity device reduced by the coupling factor and of the transmission signals further attenuated by the directional factor of the directional coupler, and wherein both the transmission signals and the reception signals at the reception signal port are supplied to the power level detector and a transmission and reception level threshold is established in the microprocessor with memory for the bidirectional time-sequential transmission and reception communication on the same frequency channel and the algorithm for controlling the antenna diversity device is configured in a manner such that on a falling below of the predefined transmission and reception level threshold at the output of the power level detector a reception time slot is recognized during which a respective different setting of the antenna diversity device is selected by the microprocessor with memory as part of a test procedure in consecutive test and the reception power level occurring on each test setting of the antenna diversity device is respectively detected and registered as the test reception power level of the vehicle transceiver device and a setting of the antenna diversity device is selected at the end of the test procedure with reference to the comparison of the test reception power levels with one another, at which setting a greater reception power level is reached and on an exceeding of the predefined transmission power level threshold, a smaller transmission power level is reached in accordance with claim 3.

8. The antenna diversity device in accordance with claim 7, wherein for the independent frequency matching of the transmission level detection on an active bidirectional frequency channel in the frequency band, an oscillator is present which is controlled by the microprocessor with memory and whose oscillator signal and the transmission or reception signals can be supplied to a frequency mixer for frequency conversion into intermediate frequency signals in a lower intermediate frequency domain and the power level of the intermediate frequency signals detected in the IF power level detector having the IF frequency band filter are supplied to the microprocessor with memory by whose frequency control of the oscillator the signal content of the individual frequency channels is determined sequentially and the transmission and reception level detection is thereupon coordinated with the active frequency channel.

9. The antenna diversity device in accordance with claim 1, wherein a selector switch electronically controlled by the microprocessor with memory for an alternating time-sequential forwarding of the transmission or reception signals to the power level detector downstream of which a frequency band filter is connected to suppress out of band signals for the separate detection of the transmission signals predominantly applied at the transmission signal port in a frequency channel within the frequency band and of the reception signals predominantly applied at the reception signal port in a frequency channel within the frequency band.

10. An antenna diversity device in accordance with claim 9, wherein the vehicle transceiver device is, however, configured for transmitting and receiving on different frequency channels and, for recognizing the transmission channel frequency and the reception channel, a frequency search algorithm frequency in the microprocessor with memory for controlling a voltage controlled oscillator whose oscillator signal with the transmission or reception signals are converted in the frequency mixer into ZF output signals at a lower frequency, which are supplied to the microprocessor with memory, and are analyzed by way of calculation there—the transmission channel frequency and the reception channel frequency are thus also stored in the microprocessor with memory.

11. The antenna diversity device in accordance with claim 10, wherein for a further relief of the calculation power of the microprocessor with memory, an intermediate frequency filter bank is present having IF frequency channel band filters corresponding to the individual frequency channels of the frequency band that is connected downstream of the frequency mixer and whose filter output signals are supplied to the microprocessor with memory, and the frequency search algorithm stored in the microprocessor with memory are configured in a manner such that the active channels can be determined and stored frequency in the microprocessor with memory via the stepwise control of the frequency of the voltage-controlled oscillator by a determination by way of calculation of the transmission levels at the individual channel frequencies in the switch position or the reception level is determined by and stored in the microprocessor with memory in the switch position.

12. The antenna diversity device in accordance with claim 1, wherein the algorithm stored in the microprocessor with memory to control the antenna diversity device is configured in a manner such that, alternatingly, the setting of the antenna diversity device is given for a smaller transmission power level at the transmission channel frequency and the setting of the antenna diversity device is given for a larger reception power level at the reception channel frequency in a cycle sequence.

13. The antenna diversity device in accordance with claim 1, wherein the multi-antenna system includes at least two single antennas and the controllable antenna combiner includes controllable antenna switches and, on the one hand, is respectively connected to the combiner signal connector and, on the other hand, to respective at least one of the single antennas whose associated switch positions are set in combination via the combiner setting signals of the microprocessor with memory at the control connector and different radiation directivities are set via different switch positions.

14. The antenna diversity device in accordance with claim 1, wherein settable phase rotation elements are present in the controllable antenna combiner so that the single antennas are combined in a differently settable manner via the settable antenna switches and the settable phase rotation elements and different radiation directivities are set via different switch positions and different settings of the adjustable phase rotation elements via the combiner setting signals of the microprocessor with memory at the control connector.

15. The antenna diversity device in accordance with claim 1, wherein the multi-antenna system is formed from a number of N>2 vertically polarized monopole antennas with the electrically conductive, horizontally oriented roof of a vehicle as an electrical counterweight of the monopole antennas, with the monopole antennas being arranged around a central point as a circular group on the lower side of the roof in the vehicle passenger compartment such that substantially a regular n-gon is formed by them.

* * * * *